Oct. 11, 1966  YAO-TZU LI  3,277,840
VEHICLE STABILIZATION SYSTEM
Filed Feb. 26, 1965  8 Sheets-Sheet 2

INVENTOR.
YAO TZU LI
BY
*Kenway, Jenney & Hildreth*
ATTORNEYS

Oct. 11, 1966  YAO-TZU LI  3,277,840
VEHICLE STABILIZATION SYSTEM
Filed Feb. 26, 1965  8 Sheets-Sheet 3

INVENTOR.
YAO TZU LI
BY
*Kinway, Jenney & Hildreth*
ATTORNEYS

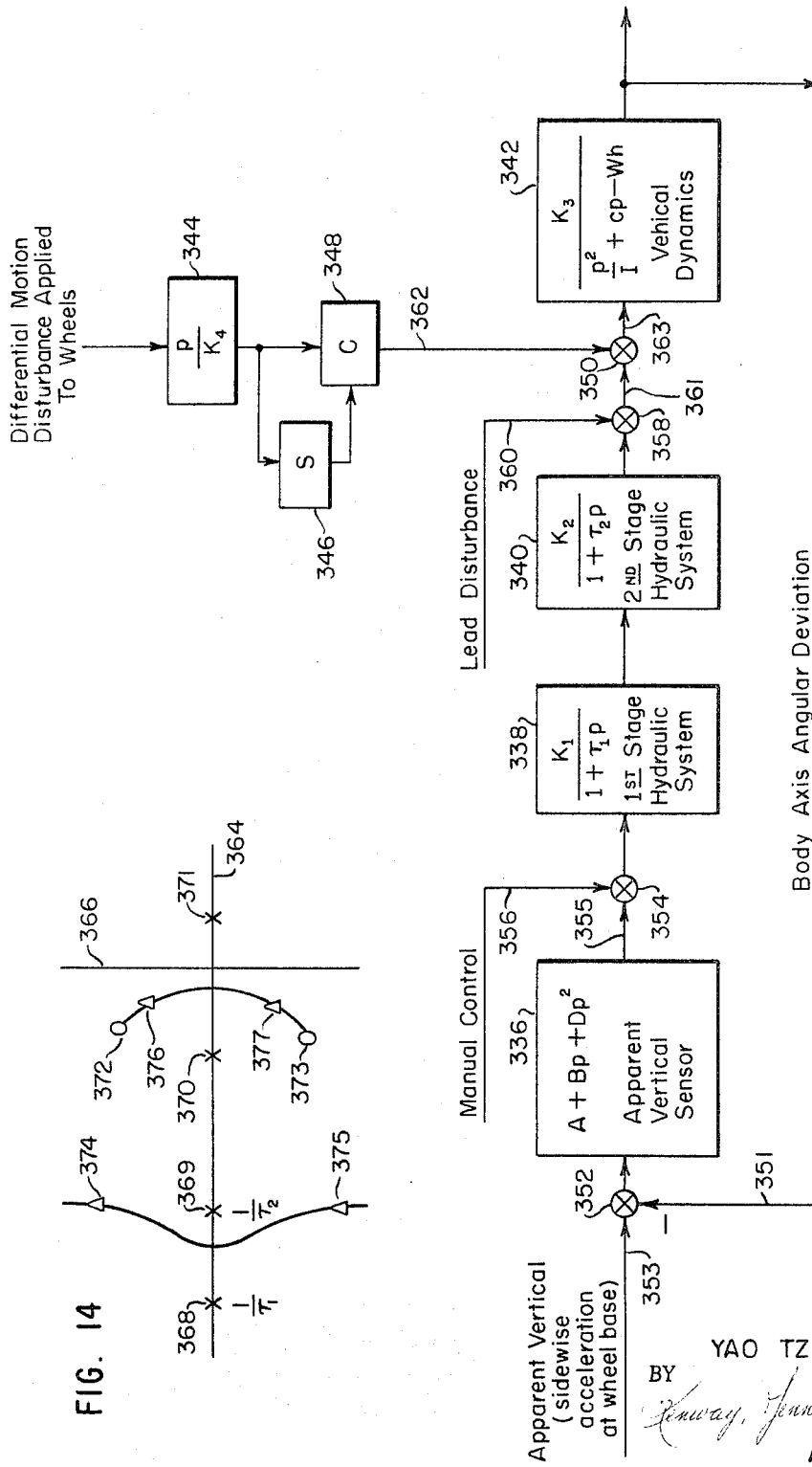

Oct. 11, 1966 YAO-TZU LI 3,277,840
VEHICLE STABILIZATION SYSTEM
Filed Feb. 26, 1965 8 Sheets-Sheet 8

INVENTOR.
YAO TZU LI
BY
ATTORNEYS

United States Patent Office 3,277,840
Patented Oct. 11, 1966

3,277,840
VEHICLE STABILIZATION SYSTEM
Yao-Tzu Li, Huckleberry Hill, R.F.D. 1,
Lincoln, Mass.
Filed Feb. 26, 1965, Ser. No. 440,993
29 Claims. (Cl. 105—145)

The present invention relates to stabilization systems, and more particularly, to lateral stabilization systems for vehicles.

This application is a continuation-in-part of application Serial No. 164,119, entitled "Vehicle Stabilization System," filed by Yao-Tzu Li on January 3, 1962, and now abandoned.

The need for lateral stabilization on vehicles occurs both when the vehicle is standing still and when the vehicle is in motion. With respect to stabilization under stationary conditions, vehicles with more than two wheels normally achieve this stability by the provision of a wheelbase whose width is substantial in comparison to the height of the center of gravity above the roadway. Since no stabilizing means other than the basic structural dimensions is provided, existing vehicles must be of substantial width. This substantial width must be provided even when the intended passenger or cargo load is very modest. The numbers of vehicles with such otherwise unnecessary widths contribute in large measure to the conjected traffic conditions prevalent around metropolitan areas. Two-wheeled vehicles, while relatively simple to construct in extremely narrow widths, possess no inherent lateral stability in the stationary state. External means, such as stands or stationary supports, must be provided.

Stability when a vehicle is in motion is important under several conditions. In the simplest case, the vehicle is proceeding in a straight course. For a vehicle with more than two wheels, considerations analogous to those for stationary situations prevail. For the two wheeled vehicle, however, lateral stability now becomes practical. The lateral stability for the two wheeled vehicle is normally achieved by a slight wobbling action of the steering wheel, which continually moves the wheel sidewise to offset any incipient leaning tendency. If the running condition is over a winding path, stability is achieved in a two wheeled vehicle by both wobbling of the steering wheel and banking the vehicle to compensate for centrifugal forces. Vehicles with more than two wheels achieve stability under winding conditions by having a sufficiently wide wheel base. The leaning which does occur in such vehicles is in the drection opposite to that whch would counteract the centrifugal forces. Finally, stability is important when the vehicle is running over uneven ground. In this case, a rise in the roadway under one side of the vehicle tends to throw the vehicle to the other side if there is appreciable lateral width in the wheelbase.

In the case of single tracked vehicles such as monorail vehicles, stability has previously been achieved either by an essentially overhead suspension or by gyroscopic stabilization. The overhead suspension leads to extremely difficult switching problems and has limited the application of monorail systems. The use of gyroscopic stabilization forces requires a substantial mass to be rotated at very high angular velocities. The gyroscopic constraint has sometimes been combined with a lateral shifting of the gyroscopic or other masses. While gyroscopic constraint permits some departure from pure overhead suspension, substantial switching problems remain, especially when system safety is considered.

The principal object of the present invention is to provide a vehicle with means to maintain stability under stationary conditions as well as in motion.

A further object is to provide vehicles with better riding comfort when traversing winding roads.

Another object is to provide vehicles with increased riding comfort when roadways with uneven surfaces are traversed.

A further object is to provide adequate stability under all operation conditions with a vehicle of narrow width.

A further object is to provide a vehicle in which the roll control and support functions are accomplished by independent means.

A further object is to provide monorail systems with improved stability characteristics.

A further object is to provide monorail systems which permit the convenient joining and crossing of individual monorail lines.

These and other objects of the invention are achieved in a vehicle by the provision of a stabilizing system including a sensing system to determine the apparent vertical of the vehicle, and a torquing system to apply a force to eliminate any deviation between the geometrical and apparent verticals. The geometrical vertical is defined as the line joining the center of gravity of the vehicle and the pivoting point of the vehicle with respect to ground. The apparent vertical is defined as the direction indicated by the resultant force composed of the gravitational force and centrifugal force of the vehicle. Another feature of the invention comprises a sensing system wherein the operator himself is a portion of the sensing mass. Another feature of the invention is the provision of a system incorporating a compound pendulum and a gyroscope within the sensing means. The invention likewise involves the several features and details hereinafter described and illustrated in conjunction with the accompanying drawings showing the invention and preferred embodiments wherein:

FIG. 13 is a block diagram of a vehicle stabilizing system according to the present invention;

FIG. 14 is a root locus plot for the system of FIG. 13;

Figure 1:
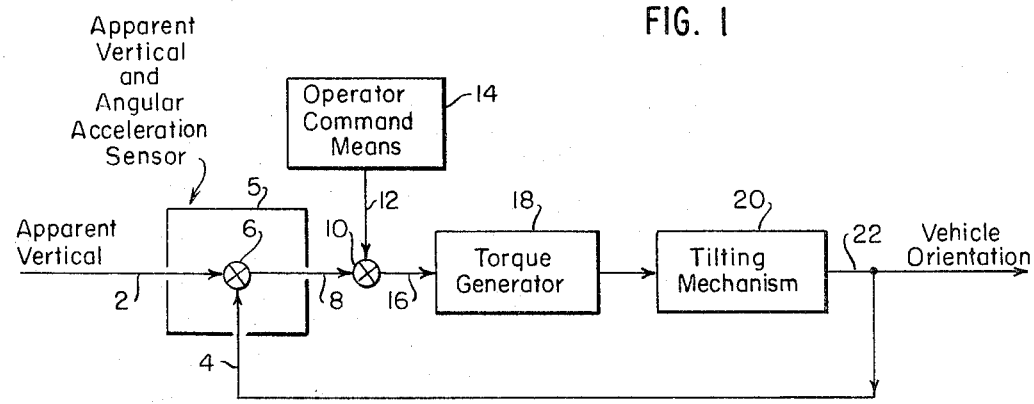
FIG. 1 is a block diagram of a vehicle stabilizing system acording to the present invention.

The logic organization of the present invention may best be understood in conjunction with the block diagram of FIG. 1. The vehicle apparent vertical 2 and the vehicle geometrical vertical are composed at the difference summing means 6 of the apparent vertical and angular acceleration sensor 5. The difference output 8 is fed to summing means 10. Summing means 10 also has an input 12 from operator command means 14. The output 16 from summing means 10 is fed through torque generator 18. The output from torque generator 18 operates tilting mechanism 20. The tilting mechanism 20 produces an output torque 22 which controls the vehicle orientation. Since the vehicle orientation is an input 4 to the apparent vertical and angular acceleration sensor 5, the entire stabilization system operates as a closed-loop feedback system.

Figure 2:
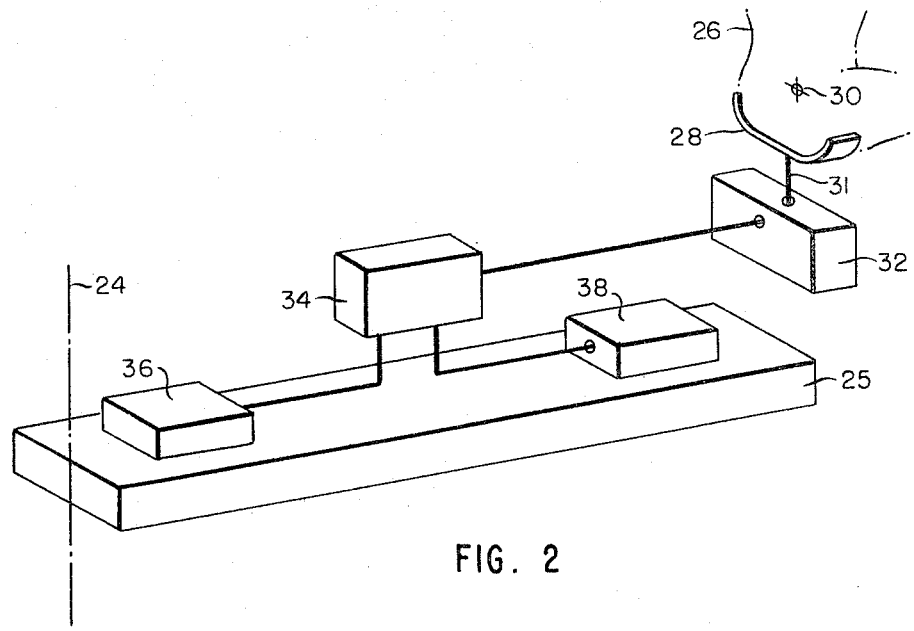
FIG. 2 is a schematic diagram of a physical embodiment of the system of FIG. 1.

A schematic physical embodiment of the system of FIG. 1 is shown in FIG. 2. Vehicle vertical axis line 24 indicates the vehicle vertical for vehicle 25. The operator 26 serves as a portion of the apparent vertical and angular acceleration sensor. Seat 28 is pivoted at point 30 and its movement provides an input to the difference summing means 32. The output from means 32 operates torque generator 34. This torque generator provides an input to the tilting mechanism 36 for the rear of vehicle 25. A similar tilting mechanism 38 is provided for the front of the vehicle.

Figure 3:
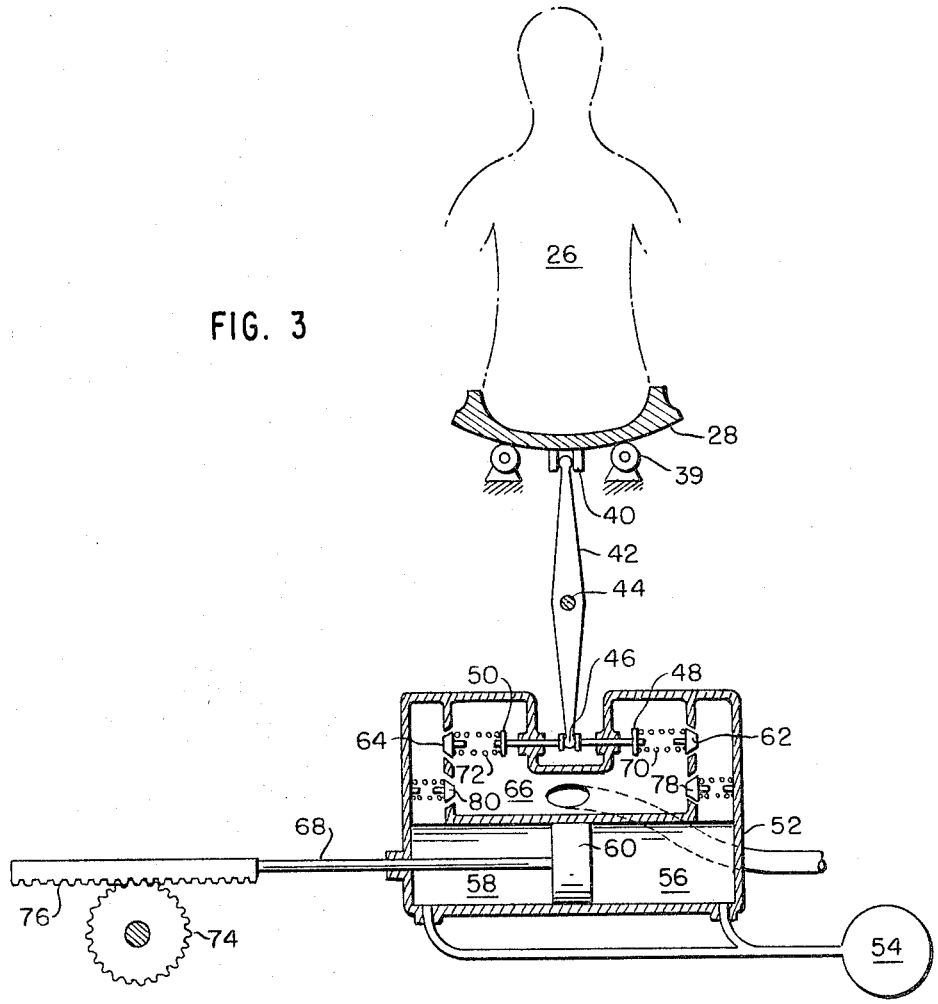
FIG. 3 is a cross-sectional view of an embodiment incorporating the operator as part of the compound pendulum.

FIG. 3 shows a more detailed view of a portion of the apparatus of FIG. 2. The operator and his supporting chair are shown as mass 26 and support 28, respectively. The support 28 is provided with two rollers 39. These rollers support the weight of the operator but allow motion in response to angular acceleration or any changes in the direction of the apparent vertical. The support 28 is provided with a yoke 40 which engages one end of the pivot arm 42. The pivot arm 42 pivots about its pivot point 44 to produce motion of connection 46. Motion of connection 46 produces motion of control plungers 48 and 50.

The power amplification portions of the torque generating mechanism are contained within the hydraulic casing 52 shown in FIG. 3. As previously noted, movement of the compound pendulum, composed in part of the operator, produces movement of valve control plungers 48 and 50. This motion produces a useful output in the following manner. First, assume that the vehicle is in a stable situation and the apparent vertical and geometrical vertical axis of the vehicle coincide. Then the pump 54 will be supplying fluid to the chambers 56 and 58 on each side of the piston 60. Since the vehicle is in equilibrium, the force on each face of the piston 60 must be equal. With equal areas, the pressures must be equal. Therefore, fluid must be equally free to escape from chambers 56 and 58. This equality of escape pressure is provided by an equal loading on check valves 62 and 64. These check valves provide paths to exhaust chamber 66. The equal pressure is provided by the fact that the check valve control plungers 48 and 50 are applying equal forces to the check valve springs 70 and 72.

Now assume that the apparent vertical has shifted and that in sensing this shift the compound pendulum moves in such a manner that the operator's body moves to the right in FIG. 3. This movement will cause the connection 46 on pivot arm 42 to move to the left. Thus, a leftward motion will be produced at the control plungers 48 and 50. The leftward motion of control plunger 48 means that the force applied to spring 70 is decreased. With the lower spring pressure check valve 62 permits fluid from chamber 56 to escape to chamber 66 more easily. At the same time, the leftward movement of control plunger 50 increases the force on spring 72. This increased force seats valve 64 more firmly, resulting in an increased pressure in chamber 58. The difference in pressure on piston 60 causes a movement from left to right of this piston with a corresponding movement of the connected push rod 68 and therefore of gear 74 which mates with a rack 76 on push rod 68.

Gear 74 is part of the tilting mechanism so that motion of this gear causes the apparent vertical to become realigned with the geometrical vertical axis of the vehicle. This realignment causes the sensing pendulum, composed of the operator 26 and seat 28, to return to its neutral position. This return also returns the control plungers 48 and 50 to their neutral positions. Thus, the pressure applied to spring 70 is again increased with a corresponding decrease in the pressure upon spring 72 so that the forces applied to check valves 62 and 64 are equal once more. With the equalization of the check valve release pressures, pressures in chambers 56 and 58 become equal. The motion of the piston 60 stops since equal forces are applied to each face of the piston.

It will be noted that there are two additional check valves; that is, valves 78 and 80 communicating with chambers 56 and 58, respectively. These valves become operative during motion of the vehicle over rough roadways. The details of such operation will be discussed subsequently.

Figure 4:
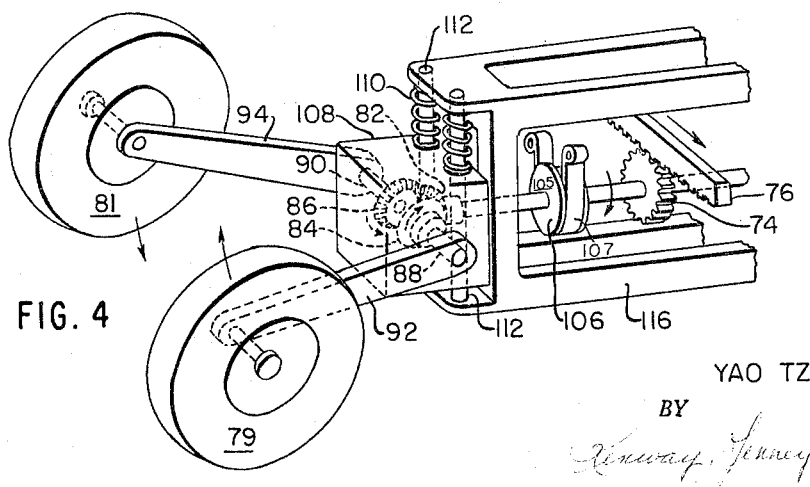
FIG. 4 is a perspective view of a tilting mechanism for use with the embodiment of FIG. 3.

One embodiment of the tilting mechanism is shown in greater detail in FIG. 4. For clarity, only two wheels 79 and 81 are shown. The operation of the tilting mechanism is as follows. A rotational input is supplied through gear 74. Bevel gear 82 is rigidly connected to gear 74 and moves in synchronism with the input rotation. If the input is in the direction shown, bevel gears 84 and 86 will be given equal rotations in the directions shown. Gears 84 and 86 are connected to shafts 88 and 90 which cause arms 92 and 94 to move in opposite directions. With the input shown, wheel 79 is raised with respect to the roadway and wheel 81 is lowered with respect to the roadway. This motion produces a shift of the geometrical vertical axis of the vehicle. This shift causes the geometrical vertical to move in the direction tending to decrease the difference between the geometrical and apparent verticals. As noted above, when the geometrical and apparent verticals coincide, there is no longer an input to gear 74 so that there is no further shift in the geometrical vertical of the vehicle.

Figure 5:
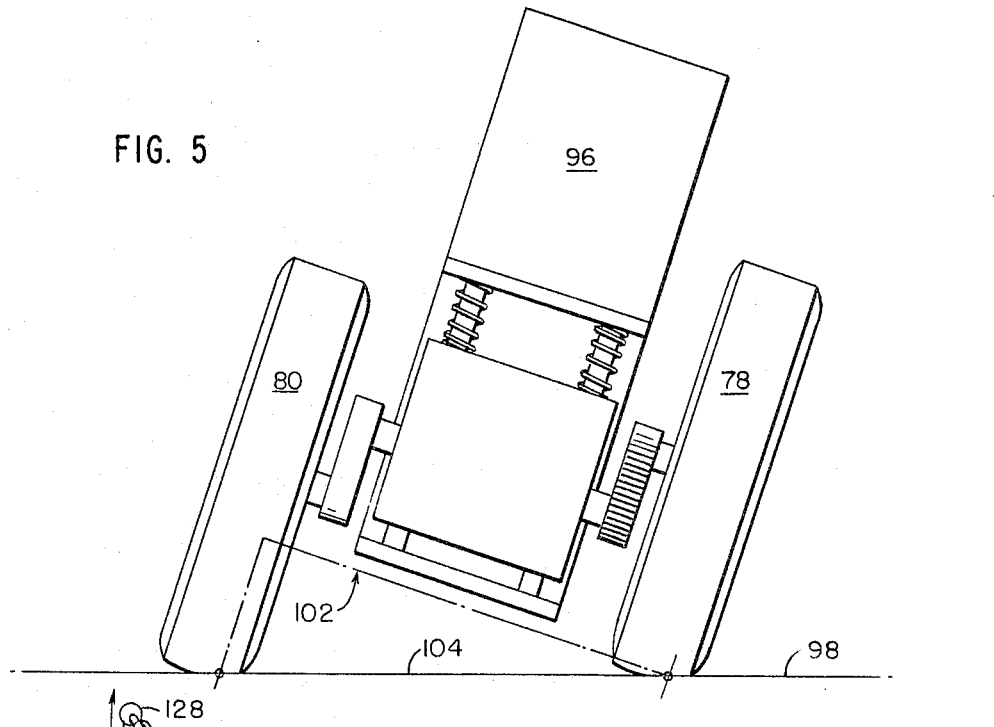
FIG. 5 is a schematic diagram of a tilted vehicle employing the mechanism of FIG. 4.

Another feature of the tilting mechanism shown in the embodiment of FIG. 4 is the provision of stability under stationary conditions. One way to insure such stability would be to provide a lock for bevel gear 82. Lateral stability exists however even without this lock. The basis for this stability is shown in FIG. 5. As shown, the vehicle 96 has tilted with respect to the ground 98. The initial separation between the wheels 79 and 81 is represented by dotted line 102. The separation after tilting is represented by the line segment 104. It is apparent that line 104 is longer than line 102 since it is the hypotenuse of a triangle, one of whose sides is line 102. In other words, tilting can only occur in conjunction with a change in the spacing between the wheels. With the vehicle stationary, the friction between the wheels and the roadway will tend to prevent the movement necessary to accomplish any change in the separation between the wheels. Thus, the tilting mechanism insures lateral stability in a standing position even without locking means for a bevel gear 82. For cases in which additional lateral stability is required, a braking assembly 106 is provided as shown in FIG. 4. This braking assembly prevents movement of bevel gear 82 and thus prevents a change in the elevation of either wheel 79 or wheel 81 as shown in FIG. 4 a conventional drum and brake band braking assembly is shown. This assembly consists of a drum 105 and a band 107. Friction between the band and the drum when force is applied to band 107 prevents angular movement of gear 82. Any conventional braking assembly could of course be used.

Thus far, the tilting mechanism has been discussed without regard for road irregularities. These may cause two problems. One of these is with respect to irregularities which present a contour to the wheels on one side of the vehicle which is different from that on the other side. The other problem regards bumps which tend to elevate wheels on both sides of the vehicle at the same time. Considering the first situation, assume that wheel 79 in FIG. 4 encounters a bump. This bump will tend to raise wheel 79 and the wheels should be free to move to accommodate this change in the terrain. Considering the gearing shown in FIG. 4, it will be seen that if such irregularities are to be accommodated, bevel gear 82 must be free to move when either wheel strikes a bump. Referring now to FIG. 3, check valves 78 and 80 now come into play. A bump under wheel 79 will tend to move push rod 68 and piston 60 to the right. This movement will increase the pressure in chamber 56 forcing fluid out through check valve 62. The ejected fluid will increase the pressure in the exhaust chamber 66. This pressure is relieved through check valve 80 which admits more fluid behind piston 60. Thus, check valves 78 and 80, in conjunction with control check valves 62 and 64, form an unloading system for piston 60 to accommodate irregular terrain.

To accommodate road fluctuations which affect both sides of the vehicle equally, the tilting mechanism housing 108 in FIG. 4 is mounted on springs 110. Guide members 112 secured to the frame 116 of the vehicle are provided for the housing. The guide members 112 serve to prevent the springs 110 from permitting any tilting action. Thus, the operation of the tilting mechanism and the operation of the springs 110 are independent of each other and meet different aspects of changes in the roadway or vehicle movement.

Figure 6:
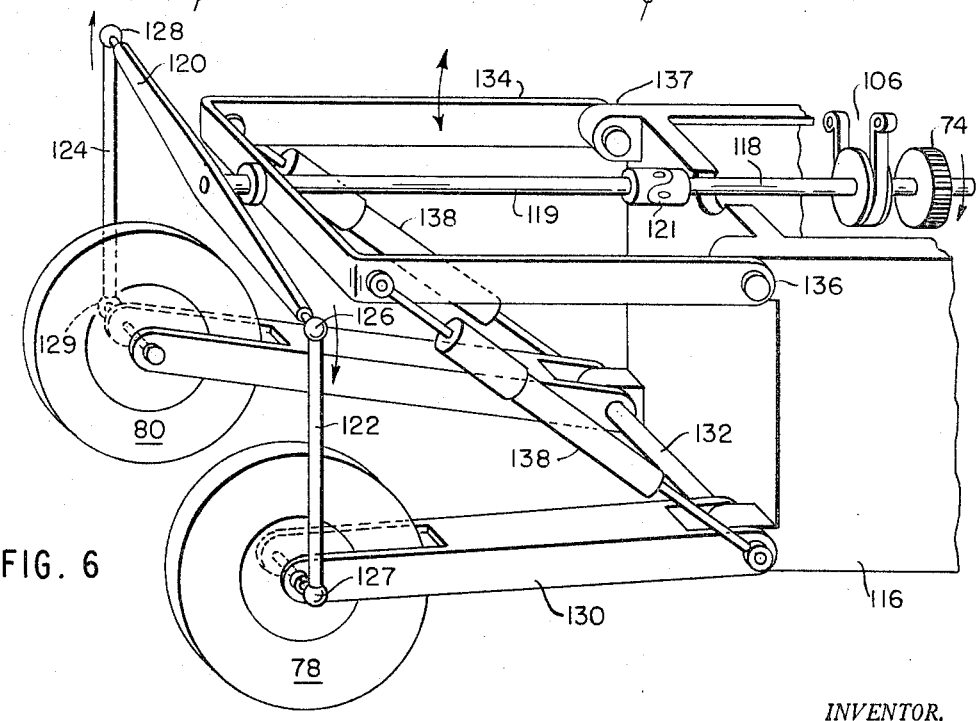
FIG. 6 is a perspective view of a tilting mechanism.

Referring to FIG. 6, another embodiment of a tilting mechanism according to the present invention is shown. Again for clarity in the drawing only the two wheels 79 and 81 are shown. Gear 74 corresponds with the input gear 74 of FIG. 4. In the present embodiment, the input from gear 74 causes rotation of shaft 118. Shaft 118 is connected to the shaft 119 by the universal joint 121. Therefore, rotation of the gear 74 causes the cross bar 120 to rotate correspondingly. Vertical linkages 122 and 124 connect the axles of wheels 79 and 81 to the ends of the cross bar 120. The connecting linkages 122 and 124 are provided with ball and socket joints 126, 127 and 128, 129, respectively, to give the necessary freedom of motion in the tilting operation.

Assume that gear 74 is given an input in the direction shown from the control mechanism. Then the cross bar 120 is tilted in the direction shown and connecting link 122 is lowered. Thus, wheel 79 is lowered with respect to frame 116. At the same time, connecting linkage 124 is raised. Thus, wheel 81 is raised with respect to frame 116. Two wheel support forks 130 are connected to the ends of the axles of wheels 79 and 81 and are free to pivot at bar 132. Bar 132 is fixed to the frame 116. Support assembly 134 is pivoted to the frame at points 136 and 137. Support assembly 134 provides the load bearing connection from the wheel assembly to the frame in conjunction with spring and shock absorber assemblies 138. Spring and shock absorber assemblies 138 prevent unrestrained movement of the wheels under load.

Stability under stationary conditions with the embodiment of FIG. 6 is similar to that provided with the embodiment of FIG. 4. As was the case with the embodiment of FIG. 4, the lateral separation between the wheels varies if the tilting angle is changed. Therefore, in a manner analogous to that for the structure of FIG. 4, the friction of the wheels upon the roadway prevents undesired tilting under stationary conditions. For occasions when this restraint is insufficient, braking assembly 106 is provided to lock shaft 118 with respect to support assembly 134.

Figure 7:
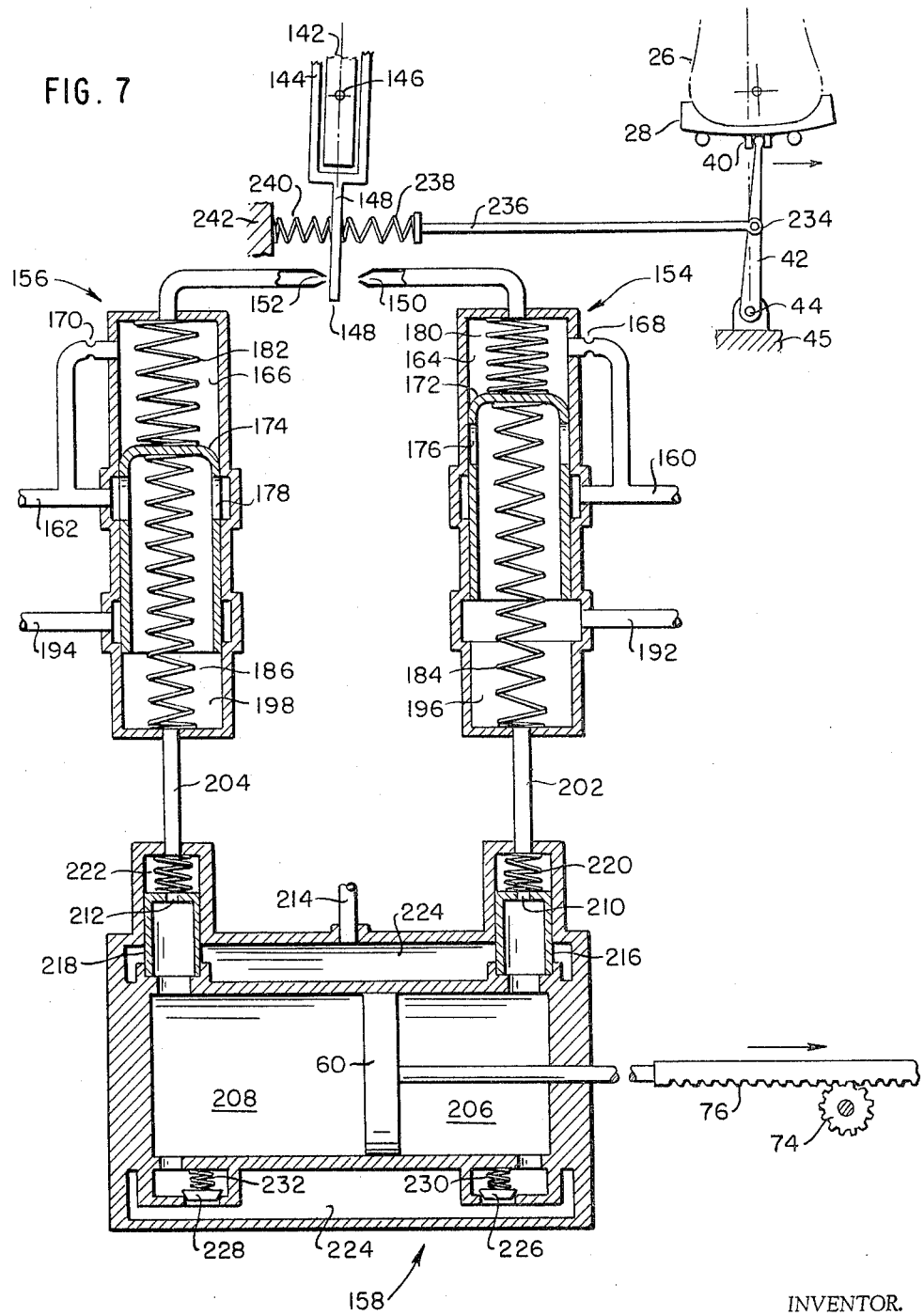
FIG. 7 is a cross-sectional diagram of an embodiment incorporating a gyro-compound-pendulum sensor.

With regard to operation over irregular road surfaces, the embodiment of FIG. 6 operates in a manner similar to that of FIG. 4 when the elevation with respect to one wheel varies differently from that with respect to the other. In other words, if the roadway rises under wheel 79, wheel 79 rises with respect to the frame and there is a corresponding lowering of wheel 81 with respect to the frame. Thus, the net motion in an elevational direction transmitted to the frame is one-half the height of the road irregularity. Provision such as that previously discussed in connection with FIG. 3, or such as that discussed hereinafter in connection with FIG. 7, is made for movement of gear 74, the tilting mechanism input, to accommodate road irregularities.

When the elevation changes with respect to both wheels, then the spring and shock absorber assemblies 138 come into play. The spring action permits support assembly 134 to rise or fall in conjunction with road irregularities and thus presents a smoother ride to the main frame 116. The shock absorber action of the assembly serves to damp out the oscillations which would otherwise occur. The spring and shock absorber assemblies 138 also come into action under conditions wherein one wheel is elevated or lowered more than the other. In such situations, the net vertical change of one-half the single wheel elevation is transmitted to the center of cross bar 120. As far as the spring and shock absorber assemblies 138 are concerned, the situation is exactly the same as that which would occur if both wheels had hit a bump whose height was one-half that of the bump which one wheel has hit. The spring action again cushions the impact and the shock absorbers damp out the oscillations which would otherwise occur.

To review the embodiments disclosed thus far, an apparent vertical sensor according to the configuration of FIG. 3 can be used in conjunction with the tilting mechanism shown in FIG. 4, or that shown in FIG. 6, to form a complete vehicle stabilizing system. The resulting system will assure stability under all operating conditions, even for a vehicle of narrow width. However, an apparent vertical sensor constructed in accordance with the embodiment of FIG. 3 requires a relatively heavy pendulum mass. This requirement arises because of two reasons. First, the force generated by the mass is used directly to activate the control plungers which operate the valves controlling the fluid supply to the cylinder containing the piston which operates the tilting mechanism. Second, the valve area must be sufficiently large to allow free circulation of the fluid for fast response and minimum kick-back when one wheel runs over a bump.

The more advanced systems discussed hereinafter incorporate a self-contained pendulum and a rate sensor. In some embodiments the rate sensor is in the form of a gyro wheel. In addition, embodiments incorporating these features include two-stage hydraulic amplification of the apparent vertical sensor output.

FIG. 7 shows a two-stage hydraulic amplifier for use with an angular acceleration and apparent vertical sensor incorporating a gyro-compound-pendulum sensor. A simplified form of this sensor is represented in FIG. 7 by a gyroscope 142, mounted in gimbal 144 pivoted at point 146. Projection 148 on the gimbal 144 serves as a flapper valve between the nozzles 150 and 152. The flapper assembly controls the operation pressure of the hydraulic flow boosters 154 and 156. Hydraulic boosters 154 and 156 in turn control the supply of fluid to the tilting control actuating mechanism 158.

The operation of the system of FIG. 7 is as follows: fluid is supplied to the hydraulic flow boosters 154 and 156 through the supply lines 160 and 162 respectively.

The orifices 168 and 170 respectively admit fluid to the chambers 164 and 166. In the position of the components shown in FIG. 7, the forces being sensed have caused the flapper 148 to tend to close nozzle 152 and to open nozzle 150. Considering now the hydraulic booster 154, the opening of nozzle 150 means that there is relatively free relief of the pressure within the chamber 164. Within the hydraulic booster 156, on the other hand, the closing of nozzle 152 means that there is restricted exit from the chamber 166. In hydraulic booster 154, the relieving of the pressure within the chamber 164 causes the spool valve 172 to move upward. The spool valve 172 thereby closes the valve port 176 to shut off supply line 160. The movement of spool valve 172 simultaneously opens the exhaust line 192. As a result of this operation, the pressure in the chamber 196 below the spool valve 172 is reduced.

The springs 180 and 184 of booster 154 and the springs 182 and 186 of booster 156 have relatively soft characteristics. Therefore, the positioning forces furnished by these springs are relatively small compared with those produced by the fluid pressure on the spool valves 172 and 174. For this reason, the aforementioned operation of the spool valve 172 tends to let the pressure in chamber 196 follow the pressure in chamber 164. Similarly, the function of the spool valve 174 tends to let the pressure in chamber 198 follow the pressure in chamber 166. Thus, with boosters 154 and 156 the flow rate is increased, and the flow restriction in and out of the main cylinder chambers 206 and 208 is reduced, as the control pressures of the two nozzles 150 and 152 are transmitted to the main cylinder chambers 206 and 208.

As shown in FIG. 7, nozzle 152 is closed while nozzle 150 is opened. Thus, the pressure inside the chamber 166 is increased which forces the spool valve 174 to move downward and thereby opens the supply line valve port 178 and closes the exhaust line 194. As a consequence, the lower chamber 198 experiences a pressure rise which will propagate to the main cylinder chamber 208 through line 204 and hole 212 of valve 218. The combined effect of the two sets of nozzle-booster systems achieves a push-pull type of operation.

In the tilting control mechanism 158 of FIG. 7, a piston 60 provided with a rack 76 mating with control gear 74 is provided, as was the case with respect to the apparatus of FIG. 3. The response of this control mechanism to the previously described action initiated by the movement of the flapper 148 will now be described. The decrease in pressure which occurred in line 202 reduces the pressure which is transmitted to chamber 206 through opening 210. On the other hand, the increase in pressure in line 204 increases the pressure which is transmitted to chamber 208 through opening 212. The increase in pressure in chamber 208 and decrease in pressure within chamber 206 means that piston 60 tends to move in the direction shown and thus activates the tilting mechanism in the proper manner. Return line 214 is provided to return excess hydraulic fluid to the supply.

Now assume that as previously described one wheel of the vehicle has encountered a bump and tilting control mechanism gear 74 should rotate. Assume that the bump is such that it tends to move the piston 60 in the indicated direction. Ideally, if the flow of the fluid offers no restriction then the wheel will move upward over the bump freely, leaving the vehicle undisturbed. On the other hand, if the fluid is frozen in the cylinder, then the vehicle would lean over due to the lift of the bump. The use of a feedback stabilizing system, such as the embodiment of FIG. 7, can overcome the tilting disturbance of this kind if the rate of rise of one wheel is slower than the response time of the system. The use of flow rate boosters also helps to reduce the pressure rise due to rapid piston movement driven by a bump. To further reduce the restriction that might occur in the pipeline or in the supply source during rapid piston motion, four unloading valves 216, 218, 226 and 228 are provided.

In the embodiment of FIG. 7, a sudden increase in pressure within chamber 206, due to a sharp movement of piston 60, in the direction shown, results in a raising of check valve 216 against the action of spring 220. Check valve 216 is the check valve containing the opening 210 through which pressure is applied to chamber 206. The raising of check valve 216 provides a path for fluid to escape from chamber 206 to the annular exhaust chamber 224. Thus, the pressure in chamber 224 is instantly increased. The increase in pressure within chamber 224 overcomes the force from spring 232 holding check valve 228 in a seated position. The opening of check valve 228 admits fluid to chamber 208 and thus increases the pressure within that chamber while at the same time releasing the pressure in chamber 206. As a result of the operation of check valves 216 and 228, the pressure on both faces of piston 60 is instantly equalized. Thus, the tilting control mechanism can move rapidly to follow a bump with little resistance from the hydraulic system.

Had the desired unloading movement been in the opposite direction, check valve 218 would have overcome the force of its seating spring 222 resulting in an increase in the pressure within exhaust chamber 224 which would raise check valve 226 against the pressure of its seating spring 230. The increase in pressure within chamber 224 would be transmitted to chamber 206 and again the pressure on each face of piston 60 would be equalized.

The embodiment illustrated in FIG. 7 has the additional feature of providing for the superposition of a manual input upon the input to the control mechanism provided from the gyro-compound-pendulum sensor. The operator 26 is provided with a seat 28 corresponding to that discussed previously in connection with FIG. 3. The seat 28 is provided with a yoke 40 which engages arm 42 pivoted at point 44. Arm 42 is pivoted at point 234 to plunger 236. This plunger engages spring 238 which bears against flapper 148. Spring 240 with characteristics corresponding to those of spring 238 is connected between flapper 148 and fixed support 242.

The operation of the manual input assembly is as follows. Assume that the motion of the vehicle, or the operator's desired input, is such that the seat 28 moves to the right as indicated in FIG. 7. Then the connecting point 234 of arm 42 affixed to plunger 236 also moves to the right. This motion reduces the force applied to the spring 238 from the right. The flapper 148 will now move slightly to the right to equalize the forces on the springs 238 and 240. This motion of the flapper 148 with respect to the nozzles 150 and 152 provides an additional input superimposed on that furnished by the gyro-compound-pendulum action. The action of the hydraulic boosters 154 and 156 and the tilting mechanism depends solely on the direction the flapper 148 tends to move, and not on the factor causing the flapper to tend to move. While a linkage that might result in substantial motion of the flapper 148 is shown for clarity in the drawings, in actual practice only a small motion and small spring pressures will be required.

It will be noted that the embodiment of FIG. 7 provides a "fail safe" feature in that the manual control will become operative should there be some difficulty with the input from the gyro-compound-pendulum sensor. Under such conditions, the operator 26 in his seat 28 will serve as a compound pendulum as previously discussed in conjunction with FIG. 3. This input will then be fed to the control mechanism in the manner just discussed in connection with FIG. 7. Therefore, the proper operation of the tilting mechanism will be obtained either in the first instance through the proper operation of the gyro-compound-pendulum sensor or through the backup operation of the gyro-compound-pendulum sensor incorporating the operator.

The operator may wish to override to some degree the automatic controls of the gyro-compound-pendulum. For example, he may wish to anticipate a turn or other change in travel conditions. To do so, he need merely shift his weight. For example, by leaning to one side he will provide an input which will be fed to control plunger 236 of FIG. 7. As discussed above, this action will provide an input to the control nozzles 150 and 152 and result in the desired movement of the piston 60 controlling the tilting mechanism.

Figure 8:
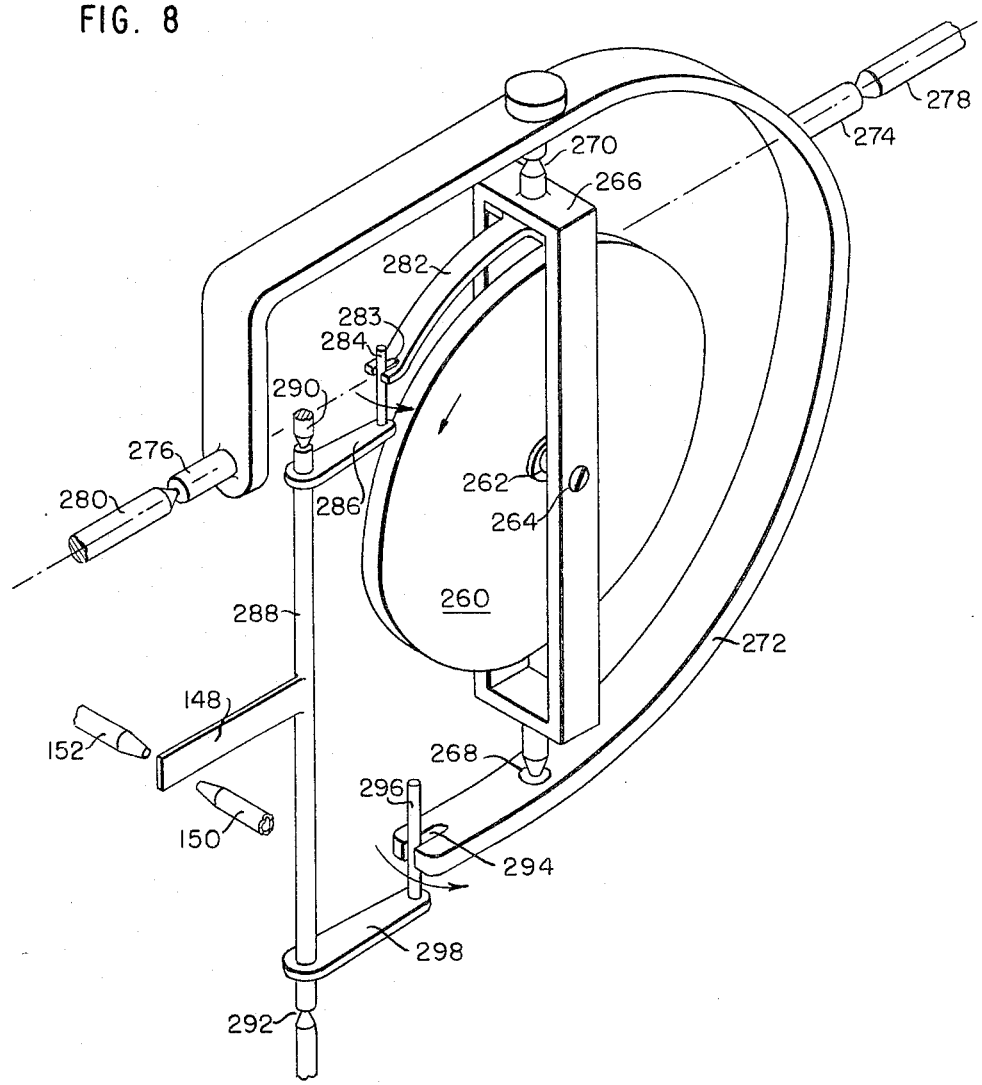
FIG. 8 is a perspective view of a gyro-compound-pendulum sensor suitable for use in the embodiment of FIG. 7.

A gyro-compound-pendulum sensor suitable for use in the embodiment of FIG. 7 is illustrated in FIG. 8. The gyro wheel 260 has an axis 262 which is mounted upon pivots at points 264 of the inner gimbal 266. The inner gimbal 266 is pivoted at points 268 and 270 to the outer gimbal 272. Arms 274 and 276 are suspended on pivots 278 and 280. Pivots 278 and 280 are aligned with the longitudinal axis of the vehicle. Thus, the gyroscope assembly serves both as a gyroscope for measuring the angular velocity along the axis joining pivots 278 and 280 and thus about the longitudinal axis of the vehicle since the angular velocity about parallel axes is identical, and also as a compound pendulum for sensing the apparent vertical and angular accelerations about the longitudinal axis of the vehicle. The engaging point 283 of yoke 282 with crank pin 284 is located on the axis of the two pivots 278 and 280 so that as inner gimbal 266 moves with the outer gimbal 272 as a compound-pendulum responding to a change in the apparent vertical, or angular acceleration about the longitudinal axis of the vehicle, the crank pin 284 remains unaffected. The crank pin 284 is connected to arm 286 on torque summing member 288. Torque summing member 288 is pivoted at points 290 and 292. While the crank pin 284 is unaffected by compound-pendulum action, the torque of the gyro wheel 260 along axis 268-270, responding to angular velocity, is transmitted by the yoke 282 through the engaging point 283 and crank pin 284 to the torque summing member 288. This torque input is balanced by the pressure difference generated in the nozzles 150 and 152, through the action of the flapper 148.

Assuming the gyro wheel is turning in the direction as shown by the arrow in FIG. 8, a clockwise vehicle banking, viewing from pivot 280 to pivot 278, would cause the gyro to produce a counter-clockwise moment, viewing from top or the end at pivot point 270. This moment in turn will push pin 284 and arm 286 in the indicated direction, and tend to rotate the torque summing member to close nozzle 152 and to open nozzle 150. As a result, a pressure difference is generated to balance the gyro generated torque. The operation as a result of the movement of flapper 148 with respect to nozzles 150 and 152 was described above in conjunction with FIG. 7.

The apparatus of the embodiment of FIG. 8 also serves as a compound pendulum. This compound pendulum senses changes in apparent vertical or angular acceleration. The compound pendulum moves about pivot points 278 and 280, this motion being utilized at yoke 294. Yoke 294 engages pin 296 which is connected to arm 298. Arm 298 is rigidly attached to torque summing member 288. Thus, when a change in the apparent vertical occurs, for example when the pendulum is tilting clockwise, looking from pivot 280 to 278, a force is generated to push fork 294 and pin 296 in the direction as shown. This force will move the flapper 148 in a direction to close nozzle 152 and open nozzle 150 and thereby generates a pressure difference to balance the force applied to pin 283 on arm 298 of the torque summing member 288.

As noted above, the compound pendulum components also sense angular acceleration. For example, assume that the vehicle carrying the pendulum makes an angular acceleration in a clockwise direction, as viewed from pivot 280, then the inertial effect of the sensing elements will produce a force at fork 294 and pin 296 in the direction shown in FIG. 8. Since the direction of the applied force is the same, the force balancing phenomenon is the same as that described above in conjunction with a change in the apparent vertical.

With the apparatus of FIGS. 7 and 8, a motion by the flapper 148 of a few thousands of an inch can change the pressure in chambers 206 and 208 by over a thousand pounds per square inch, depending upon the supply pressure. Thus, with reasonable supply pressures, and reasonably sized pistons 60, adequate force is available to rack 76 and control gear 74 which operate the tilting mechanism. Furthermore, the operation of the gyro and compound pendulum of FIG. 8 as a force balancing system limits the travel with respect to both the pendulum aspect and the gyro aspect to very small distances. This limitation of travel ensures fast dynamic response according to design specifications.

The variation of pressure-generated force as a function of the flapper movement provides an equivalent spring stiffness for the system which combines with the mass of the pendulum and gyro to determine the natural frequency of the system. Using reasonably sized components, the natural frequency of the system will be above 100 radians per second. Thus, the system will not have resonant frequencies within the range of frequencies transmitted to the vehicle by road conditions. Reasonable gyro dimensions are a gyro wheel of one pound with an angular moment of inertia of about .0025 in.$^2$ slug spinning at about 500 r.p.m. and a total compound pendulum mass of about two pounds with its center of mass about one inch from the suspension axis. The size of the tilting control activating piston 60 is not critical and might be approximately four square inches with operating pressure differentials of about 1,000 p.s.i. maximum.

Figure 9:
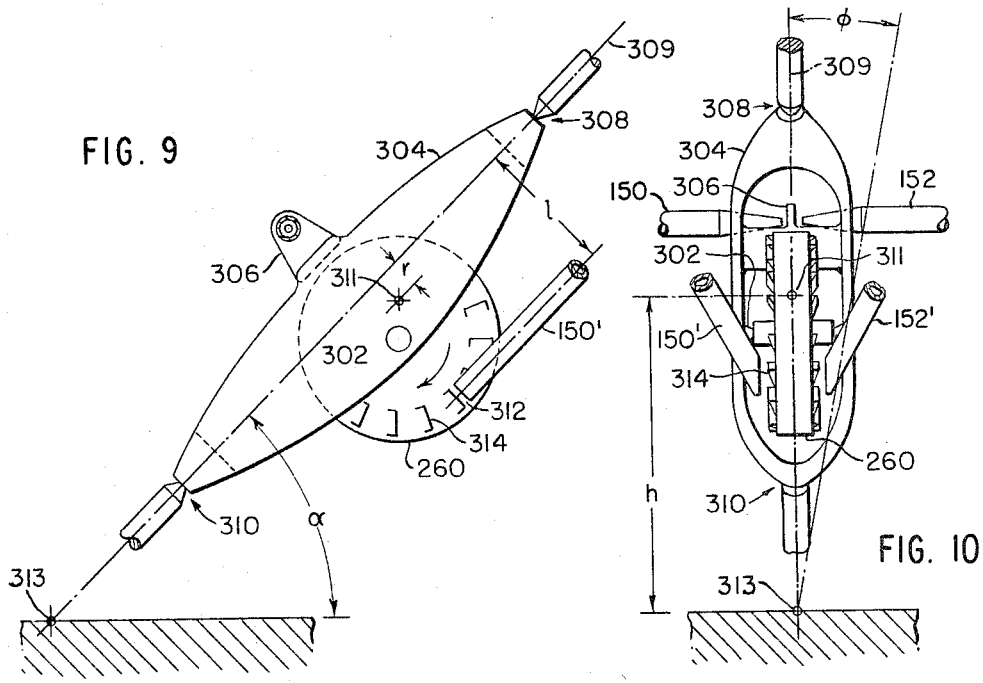
FIG. 9 shows a right side elevational view of another gyro-compound-pendulum sensor.

Another embodiment of a gyro-compound-pendulum sensor suitable for use with this invention is shown in FIG. 9. In this embodiment the gyro wheel 260 is pivoted at points 302 to gimbal 304. Flapper 306 is rigidly fixed to gimbal 304 and operates with respect to the hydraulic amplifier control nozzles in a manner identical to that in which the flapper of the apparatus of FIG. 8 operates. Gimbal 304 is pivoted at points 308 and 310. Pivot points 308 and 310 are on axis 309 in a plane parallel with the plane containing the geometrical vertical and the longitudinal axis of the vehicle. The embodiment of FIG. 9 has the axis 309 of the gimbal inclined at an angle $\alpha$ with respect to the horizontal.

An alternative position for the nozzles controlling the hydraulic amplifiers is also shown in the embodiment of FIG. 9. In practice, only one of these two locations would be provided and used. In this alternative arrangement, a separate flapper arm 306 is not used. Instead the nozzles 150 and 152 are applied to point 312 on gyro wheel 260. When the alternative location of control nozzles 150 and 152 at point 312 is used, the movement of the gyro wheel itself with respect to axis 309 serves as the flapper action. Thus, if the motion of point 312 is in a direction out of the paper, the control nozzle 150 becomes more restricted.

There has been the further provision in the embodiment of FIG. 9 of drive means for the gyro wheel incorporating the hydraulic fluid exhausted from the hydraulic control nozzles. Blades 314 are provided around each side of the gyro wheel in the annular area which includes point 312. Thus, the exiting fluid from nozzles 150 and 152 impinges upon blades 314 and serves to spin gyro wheel 260. Gyro wheel 260 may be rotated in any conventional manner, in which case blades 314 would not be provided.

Figure 10:
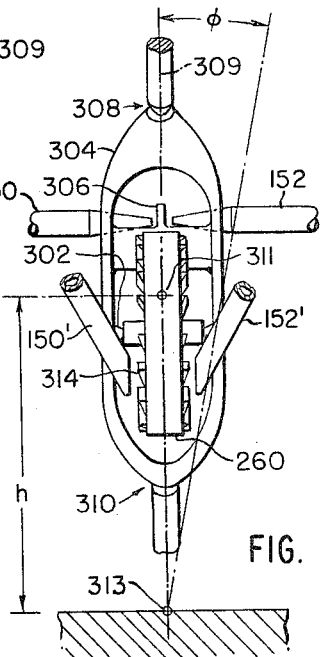
FIG. 10 shows a front elevation view of the gyro-compound-pendulum sensor of FIG. 9.

FIG. 10 is a schematic front elevation view of the gyro-compound-pendulum sensor of FIG. 9. The gimbal 304 is pivoted at points 310 and 308 on axis 309. Point 313 is on the ground level. An analysis of the gyro-compound-pendulum operation may now be made with the aid of FIGS. 9 and 10. It has been found that the motion sensor of a vehicle lateral stabilization system according to the present invention should have a primary sensitivity with respect to the angular deviation $\phi$ of the vehicle apparent vertical. In addition to this primary sensitivity, the motion sensor should also have a sensitivity in proportion to the rate of change of the angular deviation $\phi$ of the vehicle. For simplicity, this will be referred to in the following discussion and equations as $\dot{\phi}$. This sensitivity to $\dot{\phi}$ will provide a damping effect for the sensing system and vehicle. A pendulum device used to sense $\phi$ normally involves a sensitivity to angular acceleration $\ddot{\phi}$. A positive sensitivity $\ddot{\phi}$ will produce an effect in the overall control system shown in FIG. 1 equivalent to an additional moment of inertia for the vehicle. On the other hand, a negative sensitivity to $\ddot{\phi}$ will produce an equivalent of a reduction in moment of inertia about the vertical. A reduction of the moment of inertia can improve the natural frequency of the closed loop system. This reduction must be limited in the extent in which it is utilized, however, since if overdone the system would become unstable. Furthermore, the resistance of the system to disturbances from other effects, such as cross-wind or road disturbances, is decreased.

To establish a better understanding of the function of the gyro-pendulum sensor one may refer to FIG. 1 and note that in FIG. 1 the apparent vertical and angular acceleration sensor 5 may consist of either the gyro-pendulum sensor of the configuration of FIG. 8 or that of FIG. 9 plus the hydraulic amplifying system of FIG. 3 or that of FIG. 7. The hydraulic amplifier has the function of amplifying the flapper force into actuating pressure. It is the gyro-pendulum sensor which performs the primary function of converting the deviation of the geometrical vertical from the apparent vertical into the flapper force, herein designated as "$f$." The primary sensitivity of this system is therefore $df/d\phi$ where $\phi$ is the deviation angle of the geometrical vertical from the apparent vertical. To stabilize the closed loop system of FIG. 1, a lead compensation is often needed. In the present configuration, the gyro is used to accomplish this objective. The lead compensation for this system corresponds to a sensitivity of $df/d\dot{\phi}$. Due to the inertial effect of the compound pendulum, the sensor is also sensitive to the angular acceleration of the vehicle. Thus, three sensitivities are involved in the performance of the sensor 5 of FIG. 1.

Referring now to FIGS. 9 and 10, the following equations set forth a mathematical analysis involving the three sensitivities $df/d\phi$, $df/d\dot{\phi}$ and the angular acceleration effect $df/d\ddot{\phi}$. In these equations $l$ is the distance of the point 312, at which the nozzles are applied, from the axis 309. Angle $\alpha$ is the angle which axis 309 makes with the horizontal. Angle $\phi$ is the angular deviation of the system from apparent vertical about the longitudinal axis of the vehicle. Distance $r$ is the distance from the center of mass 311 of the gyro-compound-pendulum system from the axis 309. Distance $x$ is the motion of the center of mass 311 perpendicular to the plane containing the apparent vertical and axis 309. Weight $w$ equals the mass of the systems times the gravity constant $g$. Distance $h$ is the distance from ground level 313 to the center of mass 311. H is the product of moment of inertia of the gyro wheel and its rotation speed. $\ddot{\phi}$ C.G. is angular acceleration of the systems about the center of gravity 311. The moment of inertia of the system about axis 309 is I.

(1) $$\frac{df}{d\phi} = \frac{wr}{l}$$

(2) $$\frac{df}{d\dot{\phi}} = \frac{H \sin \alpha}{l}$$

(3) $$\frac{df}{d\ddot{\phi}} = \frac{d\ddot{x}}{d\ddot{\phi}} \frac{\partial f}{\partial x} + \frac{\partial f}{\partial \ddot{\phi}}$$

since (4) $$\frac{\partial f}{\partial x} = -\frac{mr}{l}$$

(5) $$\frac{\partial f}{\partial \ddot{\phi}} = \frac{\cos \alpha I}{l}$$

and (5') $$\frac{d\ddot{x}}{d\ddot{\phi}} = h$$

it follows by substitution of (4), (5), and (5') into (3) that:

$$\frac{df}{d\ddot{\phi}} = \frac{\cos \alpha I}{l} - h\frac{mr}{l}$$

Referring to Equations 2 and 6, it will be seen that both damping effect $df/d\dot{\phi}$ and the angular acceleration effect $df/d\ddot{\phi}$ are dependent upon the angle $\alpha$. Increasing the angle $\alpha$ increases the damping effect and decreases the inertia effect. Both of these adjustments effect the stability of the system. Therefore, the angle $\alpha$ may be used to adjust the damping ratio of this system for optimum performance. An angle $\alpha$ of 45° is a suitable angle for a typical application.

Figure 11:
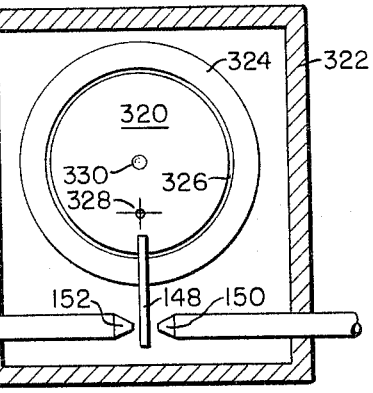
FIG. 11 is an end view of a damped compound pendulum sensor.

In the above embodiments, gyroscopic means have been used to produce a control output in response to angular velocity of the vehicle vertical. FIG. 11 shows an end view of another means for providing a sensitivity to angular velocity of the vehicle vertical. In this embodiment, a cylindrical compound pendulum 320 is contained within a housing 322. Surrounding the pendulum 320 is a cylindrical shell mass 324. The clearance between the pendulum 320 and the mass 324 is filled with a damping fluid 326. The center of mass 328 of the compound pendulum is below its center of rotation 330. Attached to the pendulum is a flapper 148 between control nozzles 150 and 152. The tendency of flapper 148 to move with respect to the nozzles 150 and 152 is utilized to control hydraulic boosters, as previously described in conjunction with FIG. 7.

The response to angular velocity of the vehicle vertical is obtained in the following manner. The damping fluid 326 provides a viscous coupling between the compound pendulum 320 and the inertial mass 324. The inertial mass 324 is free to rotate with the compound pendulum 320, or with respect to it, except as restrained by the viscous friction due to the fluid 326. Thus, the net effect is a control moment which tends to resist the angular velocity of the vehicle vertical. The situation may be represented mathematically by the following equation:

(7) $$f_2 = \Phi \frac{C}{I} p \left( \frac{\frac{I}{c}p}{1 + \frac{I}{c}p} \right)$$

Figure 12:
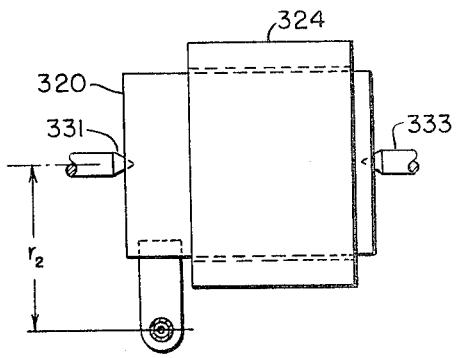
FIG. 12 shows a side view of the compound pendulum sensor of FIG. 11.

In the above Equation 7, $f_2$ is a flapper force corresponding with the $f$ of Equations 1 through 6. As shown in FIG. 12, $r_2$ is the distance between the application of the nozzles 150 and 152 to flapper 148 and the center of rotation around pivots 331 and 33. I is the moment of inertia of the inertial space mass 324. C is the damping coefficient. Angle $\phi$ is the angle of tilt of the vehicle being sensed. The symbol $p$ represents the mathematical symbol for the Laplace differential operator.

Equation 7 shows that the force produced is proportional to the rate of tilt of the vehicle and that this correspondence is modified by the effect of a high-pass filter. These characteristics thus can be designed to be effective at the natural mode of the stabilized system of the vehicle.

FIG. 13 is a comprehensive block diagram which represents the system characteristics of the present invention when any of the above embodiments are utilized. For example, it may be considered in connection with the operation of the embodiment of FIG. 7 incorporating the gyro-compound-pendulum of FIG. 8. The first block 336 represents the dynamic characteristics of the apparent vertical sensor. The combined effect of the gyro and compound pendulum sensor of FIG. 8 yields a performance function in the form of:

(8) $$A+Bp+Dp^2$$

where $p$ is the Laplace differential operator previously discussed,
$A$ is the static angle sensitivity provided by the pendulum,
$B$ is the velocity sensitivity provided by the gyro, and
$D$ is the inertial sensitivity.

The effect of these factors has been previously discussed in connection with FIGS. 9 and 10.

The second block 338 and the third block 340 represent the first and second stages respectively of the hydraulic system. The hydraulic amplifiers each operate as a first order system with time constants of $\tau_1$ and $\tau_2$ respectively. Thus the response is of the form:

(9) $$\frac{l}{l+\tau p}$$

The last block 342 on the forward loop represents the vehicle dynamic properties. In this block W represents the weight and $h$ is the height of the center of gravity from the ground. $c$ is the damping effect and I is the moment of inertia. As shown in block 342 the vehicle dynamic characteristics are:

(10) $$\frac{l}{-Wh+cp+p^2/I}$$

The negative sign associated with the term $Wh$ indicates the inverted pendulum effect of the vehicle, and the fact that the vehicle is basically unstable. The damping term $c$ is largely due to the back pressure generated in the hydraulic cylinder when the piston is driven by the vehicle body. This damping term thus tends to give some stability to the entire system. However, this same damping term also provides a moment which tends to tilt the vehicle when a wheel rides over a bump. This effect was discussed previously in conjunction with FIGS. 3 and 7. It is the effect shown on the block diagram of FIG. 13 as the blocks 344, 346 and 348. The block 344 shows the conversion of the displacement applied to the wheel to a velocity which is multiplied by the damping coefficient in block 348 to provide an input to summing point 350. The side branch provided through block 346 represents the effect of the unloading valves discussed in conjunction with FIG. 7. The unloading operation tends to reduce the damping effect.

$K_1$, $K_2$, $K_3$ in blocks 338, 340 and 342 represent system constants of the hydraulic systems and the vehicle dynamic system respectively. In addition to these characteristics of the sensors and operative portions of the system shown in FIG. 13, the various input are designated. Input summing point 352 receives an input 351 from the vehicle body axis angular deviation and an input 353 from the apparent vertical. Summing point 354 receives a manual control input 356 as well as the input 355 from the apparent vertical sensor. Summing point 358 may receive a load disturbance input 360 as well as the input 359 from the hydraulic system. As discussed above, summing point 350 receives an input 362 due to disturbances applied to the wheels, as well as the output 361 from summing point 358. The output 363 from summing point 350 is the control and disturbance input to the vehicle. The vehicle dynamics in response to this input have been discussed above.

FIG. 14 is a representation of the root locus plot of the system of FIG. 13. Axis 364 is the real axis and axis 366 is the imaginary axis. The crosses 368 and 369 represent the charactertistics of the hydraulic systems. The crosses 370 and 371 represent the characteristics of the vehicle dynamics. The two zeros 372 and 373 represent the sensor characteristics. The four triangles 374, 375, 376 and 377 represent the closed loop poles of the system. Those skilled in the servo-mechanisms arts will recognize that it it necessary to keep all four closed loop poles on the plane to the left of the imaginary axis 366. Thus, FIG. 14 shows clearly the advantage of a pair of conjugate zeros, sufficiently to the left of the imaginary axis 366 to help stabilize the system.

While the embodiments have been described with particular reference to trackless vehicles, they provide new and useful stabilization systems suitable for use on any vehicle. Of course, the feature wherein stability is provided under stationary conditions may be unnecessary in the case of a vehicle with guiding rails for the wheels or other roadway engaging members. In such a circumstance, changes in the lateral spacing of a wheel may be impossible, and a suspension system appropriate to the roadway will be utilized.

Figure 15:
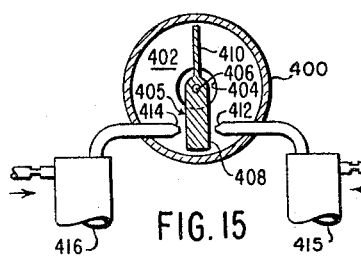
FIG. 15 is a cross-sectional diagram of a compound pendulum incorporating a fluid mass.

Referring now to FIGURE 15, another compound pendulum suitable for use with the present invention is shown. A cylindrical casing 400 contains a cylindrical fluid reservoir 402 with an exhaust port 404. A pendulum 405 is pivoted at point 406, the center of the reservoir 402. The pendulum 405 has a heavier portion 408 and a thinner vane portion 410 which serves to make the pendulum extend across substantially the full diameter of reservoir 402. Nozzles 412 and 414 cooperate with portion 408 of the pendulum to form a flapper valve assembly similar to that formed by nozzles 150 and 152 cooperating with vane 148 in the embodiment of FIGURE 7. The details for the control valve assemblies 415 and 416 are not shown since they are identical to the assemblies 154 and 156 shown in FIGURE 7.

The compound pendulum set forth above has a dominant angular momentum I which augments the gravitational effect to resist the moment acting upon the pendulum due to lateral acceleration. In the configuration of FIGURE 15 the orientation of the pendulum 404 is constrained to follow that of the vehicle frame. With this arrangement, the moment acting upon the pendulum is proportional to the output signal of the pendulum. An equation for this moment is $$M_p = \ddot{\theta}(I_p - hm_p r) + m_p g r \theta$$

where $M_p$ = moment applied to pendulum
$I_p$ = moment of inertia of pendulum
$h$ = height of mounting point from axis of roll
$\ddot{\theta}$ = lateral acceleration
$m_p$ = mass of pendulum
$r$ = distance from pendulum fulcrum to center of gravity of pendulum
   center of gravity of pendulum
$g$ = gravitational constant The above equation shows that in order to make the pendulum output $M_p$ responding to the roll angle acceleration have the same sign as its response to the roll angle $\theta$, it is necessary to adjust the parameters of the pendulum so that $I_p$ is greater than $hm_p r$. Such a pendulum is called a tuned pendulum after the Schuler tuned pendulum for inertial navigation. As an example, if the pendulum radius R is one inch and the pendulum is mounted 12 inches above the roll axis, and assuming the radius to gyration of the moment of inertia I is also one inch, the mass of the compound pendulum should be at least twelve times as heavy as a corresponding simple pendulum. One way to provide the needed moment of momentum to a pendulum is to use the liquid mass discussed above in connection with FIGURE 15. Since the pendulum extends across the diameter of the fluid reservoir 402, the fluid contained within the reservoir serves as part of the mass of the pendulum so that the moment of inertia of the pendulum can exceed $hm_p r$. The undertuned pendulums described in the existing art would be adequate for very slow roll control, but would not be suitable for fast response operation such as would be needed in an operative system of my invention.

The tuning principle should also be used to account for the dynamic behavior of the input member of the manual control, including the mass of the part of the human body. Thus, if the human posture is used to execute the manual control, then the seat should be suspended to give a pendulum motion with the effective pivot located above the center of gravity of the drivers as illustrated by the curved track of the seat 28 in the embodiment of FIG. 3. As described above in connection with FIGURES 2 and 3, such embodiments not only provide proper operation with the body as part of the sensing system, but also provides correct sign of response with manual input. The human sensing and learning system, based on the inner ear apparatus and brain, is so efficient that the human can properly execute control functions even if motion in an apparently wrong direction is required. Similarly, any body element can supply manual inputs, although arms, legs, and overall body posture are preferred means. These inputs can be applied through any of the conventional vehicular operator input means such as hand steering wheels or bars or foot pedals or bars. The particular mechanism employed will depend on the particular vehicular configuration in the operator compartment, and those skilled in the art are familiar with the selection of appropriate manual input control elements. Best operation, particularly with unskilled operators, is obtained with apparatus arranged as in the above-described embodiments so that the intuitive motion is the proper corrective motion.

Figure 16:
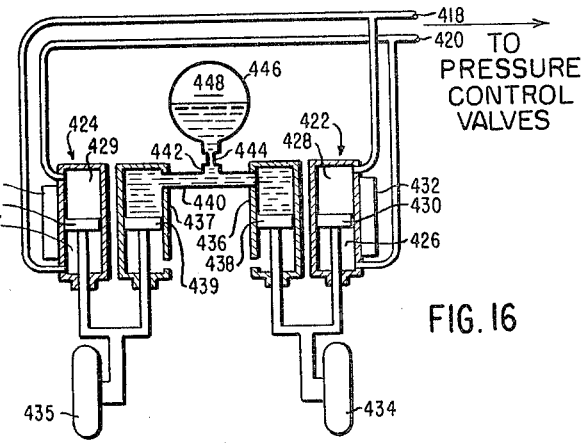
FIG. 16 is a cross-sectional view of a tilting mechanism incorporating hydraulic elements.

Referring now to FIGURE 16, a tilting mechanism according to the present invention incorporating hydraulic elements is shown in cross section. Lines 418 and 420 connect with pressure control valves and thus correspond, for example, with lines 202 and 204 of FIGURE 7. The tilting, or roll control, function is provided by cylinders 422 and 424. Suppose, for example, it is desired to raise the left hand portion of the vehicle, then the pressure is increased in line 420 and decreased in line 418. This will mean that the pressure in chamber 426 of cylinder 422 is increased while the pressure in chamber 428 is decreased. This pressure differential will cause piston 430 to move in an upward direction. On the other side of the vehicle the pressure will be increased in chamber 429 and decreased in chamber 427 so that the piston 431 will move in a downward direction. Except for the fact that two hydraulic pistons have been utilized to provide the roll control forces, the system is directly analogous to that previously set forth in FIGURES 4 and 6.

In the case of vehicles with support wheels on opposite sides of the geometrical vertical axis, the motions of these wheels will often be constrained to be in a plane parallel to the vertical axis. However, this constraint is unnecessary for the purposes of the present invention, although the most desirable performance is obtained if the wheels are maintained approximately equally distant from the vertical axis. Typically such motion will be in planes parallel to the geometrical vertical axis.

While shown only schematically as by-pass chambers 432 and 433, the hydraulic cylinders 422 and 424 of FIG. 16 are both provided with unloading arrangements similar to that set forth for the hydraulic cylinder arrangement 158 of FIGURE 7. As set forth in the above discussion of that embodiment, the unloading arrangement permits, for example, a wheel to pass over a bump without appreciably tilting the vehicle.

In addition to the cylinders 422 and 424, the wheels 434 and 435 of FIGURE 16 are also connected to hydraulic cylinders 436 and 437 respectively. These cylinders have pistons 438 and 439 respectively which serve to transmit the force produced by the pressure upon the faces of these pistons to the wheels 434 and 435 respectively as a vertical support force. The two cylinders 436 and 437 are connected by a passage 440. The passage 440 has a branch 442 provided with a restriction 444. This branch communicates with a pneumatically biased reservoir 446. The air or other gaseous medium 448 in this reservoir provides a spring-like action.

The orifice 444 and the reservoir 446 combine to make the two cylinders 436 and 437 act in a manner directly analogous to conventional shock absorbers insofar as the vertical support function is involved. However, with respect to roll control the action is fundamentally different. All conventional suspension and shock absorber systems provide a substantial degree of roll stiffness. Indeed, in conventional vehicular suspension systems such roll stiffness is a desired attribute. However, in systems according to the present invention the roll control is provided by entirely different means, and it is desired that no roll-control stiffness be presented by the vertical support system. Therefore the vertical support system has a minimum of roll restraint. In the embodiment of FIGURE 16 this separation is provided by the direct by-pass line 440 which permits free relative motion of pistons 438 and 439. Free relative motion of pistons 438 and 439 means free motion in the roll mode, since these pistons are directly linked to the wheels 434 and 435 on opposite sides of the vehicle centerline.

Similar separation of functions is provided in the earlier described mechanical embodiments. In the embodiment of FIGURE 4 it is provided by the unloading associated with rack 76 so that arms 92 and 94 controlling wheels 78 and 80 are free to undergo relative motion except insofar as constrained by desired tilt control force inputs. In the embodiment of FIGURE 6 the vertical support provided by assemblies 138 is applied to the center pivot point of arm 120 connected to the two wheel support assemblies, so that relative motion of the two wheels is independent of the support system and is restrained solely by tilt or roll-control forces applied through shaft 119.

One advantage of the system of FIGURE 16 over the earlier described mechanical systems is that greater latitude in the placement of vehicle structure is permitted. It is generally easier to orient hydraulic lines with respect to a desired vehicle space utilization arrangement than to provide for rigid mechanical linkages. However, except for this increased design freedom with respect to other structural details, the system of FIGURE 16 is directly analogous to those previously described and operates in an identical manner.

Figure 17:
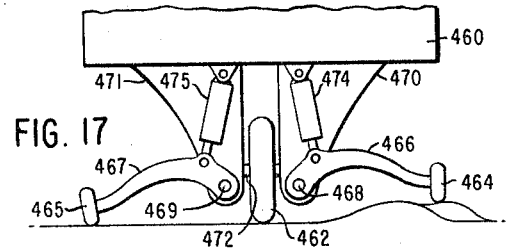
FIG. 17 is a schematic diagram of a vehicle incorporating stabilizing system according to the present invention and suitable for use in a monorail system.

Referring now to FIGURE 17, an embodiment of the present invention suitable for use with monorail type vehicles is shown. The monorail vehicle body is indicated schematically by the body portion 460. Since the vehicle is to be adapted for travel upon a monorail track, wheels 462 are provided along the centerline of the vehicle. To provide the tilting or erecting force, outrigger wheels 464 and 465 are provided. These wheels are affixed to arms 466 and 467 pivoted at points 468 and 469 respectively. Support members 470 and 471 support both the axle 472 of wheel 462 and the pivot points 468 and 469.

Force supplying members 474 and 475 apply the tilting force to the arms controlling wheels 464 and 465 respectively. The means by which force supplying members 474 and 475 are controlled can be the hydraulic system shown in FIGURE 16. In that case, members 474 and 475 would be analogous to cylinders 422 and 424. In the schematic view shown in FIGURE 17 the right hand erecting wheel 464 is riding over a bump. The unloading system associated with member 474 will permit this bump to be traversed with a minimum of disturbance transmitted to the vehicle body 464.

The wheel 472 may have a suspension and shock absorber system responsive to motion perpendicular to the ground plane. This suspension system can either employ conventional mechanical springs or the hydraulic system shown in FIGURE 16. If the hydraulic system shown in FIG. 16 is used only one support cylinder need be utilized since a single wheel at the single centerline of the vehicle is employed rather than pairs of wheels spaced apart from the centerline.

Figure 18:
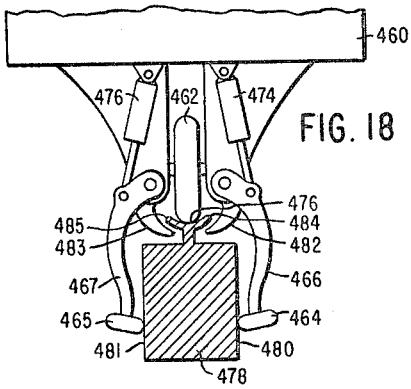
FIG. 18 is a schematic view of the vehicle of FIG. 17 operating on a straight line monorail section.

Referring now to FIGURE 18, the vehicle of FIGURE 17 is shown on a straightline portion of monorail track. The wheel 462 has engaged the bearing surface 476 of the monorail beam 478. Since the wheels 464 and 465 are force rather than displacement applying members, they have merely extended themselves downward to bear upon the vertical faces 480 and 481 of beam 478. Also, since this is a force control system, the control input required for these members is unaffected by the change in orientation of the bearing surface to which the ultimate force applying members, the wheels 464 and 465, are applied.

With the particular mechanical linkage shown for simple illustrative purposes, the angle which the wheel makes with the surface is not exactly 90 degrees for both a horizontal and a vertical contacting surface. Therefore a compromise orientation of the wheel is shown. While such an arrangement would be operable, best tire wear may be obtained if compound linkage is provided so that the wheel always remains at right angles to the contact surface, ignoring for these purposes temporary discontinuities introduced by irregularities such as bumps.

To avoid the possibility that a bump or foreign object on the monorail track might jostle the vehicle from the track, retaining arms 482 and 483 are provided. These arms may be energized in a conventional "fail-safe" technique to grip the track in case of power failure or other emergency. Members 482 and 483 are affixed to arms 466 and 467 and are linked to the motion of those arms. Therefore when the arms 466 and 467 respectively lower to engage the vertical surfaces 480 and 481 the arms 482 and 483 extend below the lips 484 and 485 of the bearing surface 476 of the monorail beam. The members 482 and 483 have no function when the vehicle is on level ground. Therefore to provide a fully retracted state for those conditions and a fully extended state for operation on the monorail beam, the members 482 and 483 will normally be linked to have an angular motion which is more rapid than that of the arms 466 and 467 to which they are linked. Thus, the final fraction of motion which brings the wheels 464 and 465 to engagement on a vertical surface will fully extend the arms 482 and 483. This motion is, of course, actuated by the force applied by control members 474 and 475.

Figure 19:
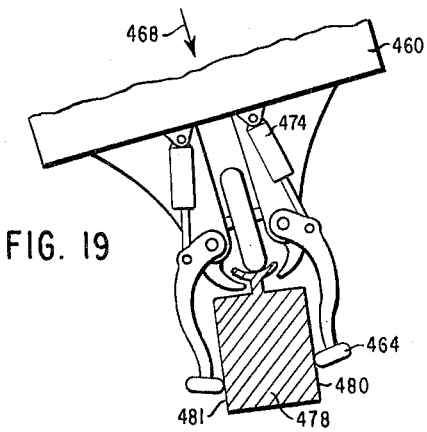
FIG. 19 is a schematic view of the vehicle of FIG. 17 operating along a curved monorail section having insufficient bank for the speed of travel.

Referring now to FIGURE 19, the monorail vehicle 460 is shown on a curved section of monorail track. Since the track is curved the beam 478 is tilted so that its normally-vertical side surfaces 480 and 481 have deviated from the vertical. In the schematic view shown the curve is to the left as one looks into the paper. It will be noted that the vehicle 460 is tilted even more than the vertical surfaces of the monorail beam. In the position illustrated the vehicle is traveling at a speed greater than that for which the banking of the monorail support structure provides exact compensation. Therefore the force supplying member 474 has increased the force applied through wheel 464 so that the vehicle is tilted still further to the left. This tilt has been continued until the geometrical vertical axis 486 of the vehicle has been brought into alignment with the vehicle's apparent vertical axis. All of the physical components of the vehicle and monorail structures remain the same and are those discussed previously in connection with FIGURES 17 and 18.

Figure 20:
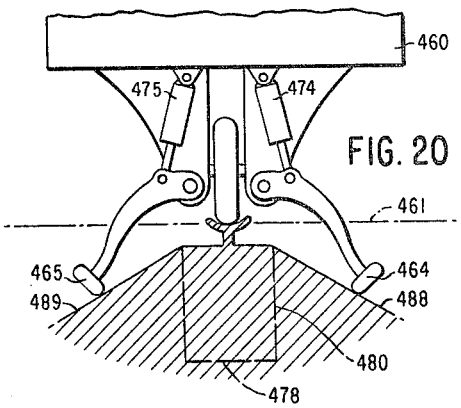
FIG. 20 is a schematic view of the vehicle of FIGURE 17 traversing a transitional track from monorail to level ground condition.

Referring now to FIGURE 20, a monorail vehicle 460 is shown traversing an arrangement suitable for the transition between the monorail track beam structures of 18 and 19 and the level ground situation of FIGURE 17. In this transition stage the monorail beam 478 has merged into a tapered structure having surfaces 488 and 489 which will smoothly carry the wheels 464 and 465 from the vertical position 480 to the horizontal position 461.

Presently existing monorail systems are particularly handicapped by their inability to join easily feeder lines or to permit grade crossings. With the tilting or roll-control mechanism of the present invention the vehicle can equally well run on the monorail beam structure or on level ground. Furthermore, the transition may be smoothly made using tapered segments such as that shown in cross section in FIGURE 20. The control members 474 and 475 will continue to apply the proper erecting forces so that their function and control is unaffected by these changes in the surface traversed by the force applying wheels 464 and 465.

Figures 21, 22:
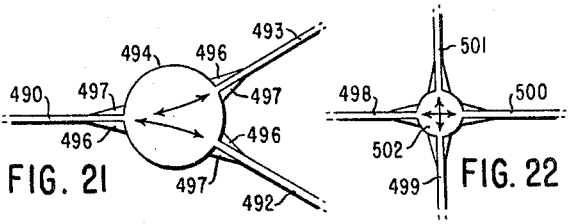
FIG. 21 is a schematic view of a monorail junction suitable for use with a vehicle of FIGURES 17 through 20.
FIG. 22 is a schematic view of a monorail crossing suitable for use for the vehicle of FIGURES 17 through 20.

Referring now to FIGURE 21, an arrangement suitable for a junction with a monorail vehicle employing support systems according to the present invention is shown. A single track 490 is shown to the left with two tracks 492 and 493 out to the right. A central flat section 494 is provided. While this section is shown as circular in shape for convenience in the drawing, there is no particular requirement as to its area, so long as it exists in the region between the merging tracks. To provide a transition between the monorail beam sections 490, 492 and 493 and the central flat section 494, tapered sections 496 and 497 are provided for each beam. The surfaces 488 and 489 of FIGURE 20 are illustrative of a cross section through such a junction region.

Assume now that a vehicle is approaching from the left along monorail beam 490. As the flat area 494 is approached, the tilt support wheels will engage the surfaces 496 and 497. Thus these wheels will be smoothly raised to the horizontal position required as the section 494 is traversed. Within the section 494 the vehicle is traveling freely on terrain and can turn to either track 492 or 493 as desired. Other possibilities could be provided but only two branch routes are shown for simplicity in the drawing. As noted there is no limit to the area of the section 494 so that if desired it can include city streets. Thus the monorail vehicle can make a side trip to pick up passengers in a particular suburban area if that type of operation is desired. Then, when the route along that section of flat area 494 which includes the suburban streets has been completed the vehicle can continue on along, for example, the monorail track 492 if that leads to the central city or other desired route.

FIGURE 22 shows a transition area similar to that of FIGURE 21 except that four crossing monorail tracks 498 through 501 are shown. These monorail tracks join at a central area 502 which is a level area similar to the area 494 of FIGURE 21. Similarly each monorail track is provided with a transitional region as it approaches the central area. Again the central area may be merely sufficient in size to permit a grade crossing to be made, or it can be extended to any desired area, even to include regular streets in the area. If desired, guide tracks may be provided in the flat areas. Particularly in a crossing situation, the need for operator steering can be avoided. If desired, even the junction situations of FIG. 21 can be controlled by guide tracks and external switching.

The extreme versatility of the vehicle stabilization system of the present invention, with its separation of the roll control and support functions, is emphasized by the suitability of the system for vehicles with wheels on both sides of the vehicle centerline as well as vehicles with wheels along the centerline for monorail operation. Indeed, the system is not only suitable for use in a monorail system, it permits advantages heretofore impossible with existing monorail techniques. As set forth above, monorail vehicles employing stabilization systems of the present invention may run equally well upon monorail beams or city streets. Thus, feeder lines can pick up passengers at convenient loading points and then travel efficiently into central sections along monorail tracks.

In view of the embodiments which have been described above, it may be helpful to review some of the basic considerations involved. As illustrated in FIGURE 1, the stabilizing system is essentially a closed loop control system with three major components. One of these components is the apparent vertical deviation sensor. This component indicates the true vertical when the vehicle is standing still and indicates the apparent vertical when the vehicle is moving. The second major component is a means to generate an erecting force when the vehicle geometrical vertical deviates from the desired position. The final component is a force applying means to react with the ground support structure so that the erecting torque can actually change the vehicle orientation. As shown in FIGURE 1 the operator can, through input line 12, apply manual controls which may supplement, or modify, the automatic inputs. For example, higher performance on a turn can be obtained by a slight anticipation of the turn so that the vehicle is leaning into the turn as it commences. This may be considered a "coordinated" turn. Indeed, when the operational conditions are such that automatic sensing is not required for safety or other performance reasons, the operator can furnish the apparent vertical and angular accelerator sensor inputs. The remainder of the system remains identical.

A major feature of the third component, the force applying or tilting mechanism, item 20 of FIGURE 1, is the substantially complete isolation of this function from the load support function. In all existing vehicles these functions are not isolated. Indeed, roll restraint is one of the desired attributes of existing load suspension systems, particularly in the automotive field. However, with the present invention the roll control function is performed by a closed loop control system. If the roll control mechanism is not free to move independently of the load control system the performance of the closed loop system will be degraded. Of course, in emergency conditions, or when the vehicle is standing still, the roll control mechanisms are subject to being locked to provide a rigid safety device for stationary periods or during emergencies. This locking feature provides a "fail-safe" aspect. Performance during the locked condition will be seriously impaired, however, insofar as vehicle stabilization under motion is concerned.

As set forth above, the system of the present invention not only provides superior performance systems for conventional vehicles, either of conventional or less than conventional width, but also for monorail vehicles. A monorail vehicle might be thought of as having substantially zero width insofar as the load support mechanism is concerned. In practice the support will normally be less than one-half the overall vehicle width. Since the stabilizing means of the present invention operate on a force applying basis, performance is not degraded by major changes in the ground contour. Thus, the conventional monorail support can blend to ordinary roadway support with no degradation in the roll support function so that efficient speeds may be maintained. That is, the road contour for the force applying means can range from the vertical sides of a monorail support means to the horizontal surface of an ordinary roadway. Under all conditions the roll angle of the vehicle is determined by the apparent vertical and is independent of the road contour. In steady state operation the side wheels will exert on a nominal force to track the monorail support or ground. In case of a turn, or an externally applied imbalance force such as uneven loading or wind pressure, enough force will be generated to push the vehicle to the desired orientation.

Some of the advantages of a monorail system according to the present invention are superior performance in conventional monorail operation. For example, more efficient lateral stabilization in high speed operation and fail-safe and instant safety protection in case of mechanical failure or other calamities are provided. Most important, however, is the fact that as discussed above in some detail monorail devices according to the present invention can be used either on a flat road bed with no rail to guide the direction or on a structure with a rail to guide the direction. The change from one condition to the other may be made instantly and continuously without any need to stop the vehicle. Thus the vehicle can either be operated under conditions where its direction is constrained by the external configuration, or under conditions where the operator can steer the direction of the vehicle at will. Therefore commuting or mass transportation systems can be completely flexible to suit the passenger density distribution. Indeed, the system can be different at different times of the day if that is desired. While road surface undulations would presumably be at a minimum on the direction-constrained structures, the vehicle is inherently provided with a system providing a minimum of passenger discomfort due to undulations of the road surface when conventional roadways are traversed.

While these embodiments are particularly useful on vehicles of narrow width, they provide valuable stabilization systems for a vehicle irrespective of its lateral width. Although the above described embodiments present particularly advantageous uses of the stabilization system of the present invention, those concerned with the motion of vehicles, or indeed with the motion of any objects whose orientation with respect to a reference support surface is to be controlled, will recognize that variations may be made in the materials and details of these arrangements without departing from the scope of the present invention.

Having thus described my invention, I claim:

1. A stabilized vehicle system comprising a vehicle having a geometrical vertical axis, a longitudinal axis, and an apparent vertical axis, said geometrical vertical axis and said longitudinal axis defining a geometrical vertical plane, said apparent vertical axis and said longitudinal axis defining an apparent vertical plane, a suspension system, wheels on both sides of said geometrical vertical plane, said wheels being adapted to run upon a roadway, said suspension system including means for adjusting the position of said wheels with respect to said vehicle, said adjusting means being operative to produce equal and opposite motions of the wheels on opposite sides of said geometrical vertical plane, said motions maintaining the wheels substantially parallel to and equidistant from said geometrical vertical plane, wherein the raising of the wheels on one side of said vehicle produces a corresponding lowering of the wheels on the other side of said vehicle with an accompanying change in the horizontal separation of said wheels, force applying means responsive to an operator's command, means to apply said force to said suspension system to control the deviation of the geometrical vertical plane from the apparent vertical plane, the control of said deviation serving to control the stabilization of said vehicle, said force applying means including an hydraulic piston to actuate said adjusting means to vary the elevation of said wheels with respect to said roadway, whereby the respective elevation of said wheels on each side of said geometrical vertical plane is changed in response to said deviation of the apparent vertical plane from said geometrical vertical plane, said piston being positioned within a cylinder in accordance with said deviation, and additional means to permit the relatively free movement of said piston in response to any roadway produced changes in elevation of the wheels on one side of said geometrical vertical plane.

2. A stabilized vehicle system comprising a vehicle having a geometrical vertical axis, a longitudinal axis and an apparent vertical axis, said geometrical vertical axis and said longitudinal axis defining a geometrical vertical plane, said apparent vertical axis and said longitudinal axis defining an apparent vertical plane, a suspension system, wheels on both sides of said geometrical vertical plane, said wheels being adapted to run upon a roadway, said suspension system including means for adjusting the position of said wheels with respect to said vehicle, said adjusting means being operative to produce equal and opposite motions of the wheels on opposite sides of said geometrical vertical plane, said motions maintaining the wheels substantially parallel to and equidistant from said geometrical vertical plane, wherein the raising of the wheels on one side of said vehicle produces a corresponding lowering of the wheels on the other side of said vehicle with an accompanying change in the horizontal separation of said wheels, means to sense the apparent vertical plane, means responsive to an operator's command to modify the output from the apparent vertical sensing means, means to determine the deviation of said apparent vertical axis from said geometrical vertical plane, means to produce a force proportional to said deviation, and means to apply said force to said suspension system to control the deviation of the geometrical vertical axis from the apparent vertical plane, whereby the respective elevation of said wheels on each side of said geometrical vertical plane is changed in response to said deviation of the apparent vertical plane from said geometrical vertical plane, the control of said deviation serving to control the stabilization of said vehicle.

3. A stabilized vehicle system comprising a vehicle having a geometrical vertical axis, a longitudinal axis, and an apparent vertical axis, said geometrical vertical axis and said longitudinal axis defining a geometrical vertical plane, said apparent vertical axis and said longitudinal axis defining an apparent vertical plane, a first suspension system, said first suspension system serving to support the load of said vehicle, said first suspenion system permitting substantially free motion in directions introducing deviations between said geometrical vertical plane and said apparent vertical plane, a second suspension system, said second suspension system being adapted to control motions introducing deviations between said geometrical vertical plane and said apparent vertical plane, force applying means for said second suspension system, means to apply said force to said second suspension system to control the deviation of the geometrical vertical plane from the apparent vertical plane to stabilize the vehicle or initiate a coordinated turn, and control means responsive to the vehicle operator's command for said force applying means, whereby said second suspension system can be utilized to control the vehicle vertical stabilization independently of said first suspension system.

4. A stabilized vehicle system comprising a vehicle having a geometrical vertical axis, a longitudinal axis, and an apparent vertical axis, said geometrical vertical axis and said longitudinal axis defining a geometrical vertical plane, said apparent vertical axis and said longitudinal axis defining an apparent vertical plane, a steering mechanism, said steering mechanism having an axis generally parallel with said geometrical axis, a load suspension system, the vehicle longitudinal axis oriented generally orthogonal to said geometrical vertical axis and said steering axis, said load suspension system permitting substantially free motion about said longitudinal axis, a roll control system, said roll control system being adapted to control vehicle motion about a roll axis parallel to said longitudinal axis, force applying means to control said roll control means, and means to control said force applying means by the steering mechanism along an axis orthogonal with the axis used for steering, said roll control system thus serving to control the deviation of the geometrical vertical plane from the apparent vertical plane to stabilize the vehicle or initiate a coordinated turn.

5. A stabilized monorail vehicle system comprising a vehicle having a geometrical vertical axis, a longitudinal axis, and an apparent vertical axis, said geometrical vertical axis and said longitudinal axis defining a geometrical vertical plane, said apparent vertical axis and said longitudinal axis defining an apparent vertical plane, load support means for said vehicle adapted to engage a mono- rail type structure, said support means permitting substantially free motion about the longitudinal axis of said monorail structure, roll control means for said vehicle, said roll control means being adapted to control vehicle motion about a roll axis parallel to the longitudinal axis, said roll control means including force applying means on each side of the vehicle centerline, a linear accelerometer to sense linear acceleration and gravitational component perpendicular to the geometrical vertical plane, the output from said linear accelerometer providing a first correction input proportional to the deviation of said apparent vertical plane from the geometrical vertical plane, an angular accelerometer oriented to sense angular acceleration about an axis having a component parallel to the longitudinal axis of the vehicle, the output from said angular accelerometer providing a second correction input, means responsive to said first and second correction inputs to produce a control force, and means responsive to said control force to energize said roll control means so that the force applying means serve to control the deviation of said geometrical control vertical plane from said apparent vertical plane.

6. A stabilized monorail vehicle system comprising a vehicle having a geometrical vertical axis, a longitudinal axis and an apparent vertical axis, said geometrical vertical axis and said longitudinal axis defining a geometrical vertical plane, said apparent vertical axis and said longitudinal axis defining an apparent vertical plane, load support means for said vehicle adapted to engage a monorail type structure, roll control means for said vehicle, said roll control means being adapted to control vehicle motion about a roll axis parallel to the longitudinal axis, said roll control means including force applying means on each side of the vehicle centerline, a linear accelerometer to sense linear acceleration and gravitational component perpendicular to the geometrical vertical plane, the output from said linear accelerometer providing a first correction input porportional to the deviation of said apparent vertical plane from the geometrical vertical plane, an angular accelerometer oriented to sense angular acceleration about an axis having a component parallel to the longitudinal axis of the vehicle, the output from said angular accelerometer providing a second correction input, means responsive to said first and second correction inputs to produce a control force, means responsive to said control force to actuate said roll control means, whereby the force applied by said force applying means on each side of the vehicle centerline is varied in response to said deviation of the apparent vertical plane from the geometrical vertical plane.

7. A monorail system including at least one monorail vehicle having a geometrical vertical axis and an apparent vertical axis, load support means for said vehicle adapted to engage a narrow monorail type structure, roll control means for said vehicle, said roll control means including force supplying means on each side of the vehicle centerline, said system including first sections of monorail track having a width equal to less than one-half of the maximum vehicle width, at least one second section containing substantially flat areas permitting unrestrained travel direction, and third transition sections adapted to smoothly guide said force applying means from said narrow regions to said substantially flat regions, whereby the course of said vehicle can be changed from one of said narrow sections to another one of said narrow sections without stopping said monorail vehicle.

8. A stabilized vehicle system comprising a vehicle having a geometrical vertical axis, an apparent vertical axis, and a longitudinal axis, said geometrical vertical axis and said longitudinal axis defining a geometrical vertical plane, said apparent vertical axis and said longitudinal axis defining an apparent vertical plane, a linear accelerometer to sense linear acceleration and gravitational component perpendicular to the geometrical vertical plane, the output from said linear accelerometer providing a first correction input proportional to the deviation of said apparent vertical plane from the geometrical vertical plane, an angular accelerometer oriented to sense angular acceleration about an axis having a component parallel to the longitudinal axis of the vehicle, the output from said angular accelerometer providing a second correction input, means responsive to said first and second correction inputs to produce a control force, a support system for said vehicle, said support system including an erecting system for said vehicle to produce roll-motion of said vehicle about a roll axis parallel to its longitudinal axis to control the orientation of the geometrical vertical plane of said vehicle with respect to said support system, and means to apply said control force to said erecting system to produce a roll-motion torque proportional to said control force to control the deviation of the apparent vertical plane from the geometrical vertical plane of the vehicle, the roll-motion torque produced in response to said first and second correction inputs, respectively, being opposite in sign to the deviation of the apparent vertical plane from the geometrical vertical plane and the angular acceleration producing said correction inputs.

9. The apparatus of claim 8 wherein a compound pendulum serves as the seismic mass and moment of inertia of the linear and angular accelerometers respectively, a support axis for said pendulum, said support axis having a substantial component parallel to the longitudinal axis of the vehicle, the moment of inertia of said pendulum at least equalling the product of the mass of the pendulum times the distance from the center of gravity of the pendulum to the support axis times the distance from the support axis of the pendulum to the roll axis.

10. The apparatus of claim 9 wherein said vehicle is provided with an operator command system, said operator command system producing command control outputs, means utilizing said command control outputs to modify the control force and produce a modified control force, whereby the roll-motion torque produced by the control force is modified in response to command control outputs from said operator command system.

11. The apparatus of claim 9 wherein said means to apply said control force to produce a roll-motion force includes an hydraulic system comprising a supply source, a control valve and a primary actuator for producing said roll-motion force, said control valve controlling the connection of said primary actuator to a pressure port of said source, and a second actuator connected to the same pressure port as the first actuator, the output of said second actuator being connected to said control valve in an orientation to reduce the opening of the control valve.

12. The apparatus of claim 9 wherein said control force is utilized to operate an hydraulic amplifier, said hydraulic amplifier having an input and an output system, the combined seismic mass and hydraulic amplifier input system having viscous damping and a natural frequency of approximately 100 radians per second.

13. The apparatus of claim 9 wherein said system includes means to sense the angular rate of change of said geometrical plane with respect to inertial space about an axis having a component parallel to the longitudinal axis of the vehicle to produce a third correction input and wherein the means responsive to said first and second correction inputs is also responsive to said third correction input to produce the control force, the roll-motion force produced in response to said third correction input being opposite in sign to the angular rate of change producing said correction input.

14. The apparatus of claim 13 wherein said means to sense the angular rate of change includes a second inertial mass, a viscous fluid, and means including said viscous fluid to connect said second inertial mass to said compound pendulum, said connction providing viscous friction between said second inertial mass and said compound pendulum.

15. The apparatus of claim 13 wherein said means to sense the angular rate of change includes a gyroscope, the spin axis of said gyroscope having a substantial component perpendicular to the longitudinal axis, a gimbal system for said gyroscope, the axis of said gimbal system being oriented perpendicular to said longitudinal axis and said spin axis, the torque of said gimbal system with respect to its axis providing said third correction input in response to angular rate of change of the geometrical vertical plane about said longitudinal axis.

16. The apparatus of claim 15 wherein said vehicle includes an element to support an operator, said operator support element forming part of a second compound pendulum, said second compound pendulum being pivoted on an axis having a substantial component parallel with the longitudinal axis, the torque produced by said pendulum with respect to its axis producing a fourth correction input, and means to combine said first, second, third and fourth correction inputs to produce the control force.

17. The apparatus of claim 8 wherein said system includes means to sense the angular rate of change of said geometrical vertical plane with respect to inertial space about an axis having a component parallel to the longitudinal axis of the vehicle to produce a third correction input and wherein the means responsive to said first and second correction input is also responsive to said third correction input to produce the control force, the roll-motion force produced in response to said third correction input being opposite in sign to the angular rate of change producing said correction input.

18. The apparatus of claim 17 wherein said angular accelerometer contains an inertial mass and the means to sense the angular rate of change includes a second inertial mass, a viscous fluid and means including said viscous fluid to connect said second inertial mass to said first inertial mass, said connection providing viscous fricton between said first and second inertial masses.

19. The apparatus of claim 17 wherein said means to sense the angular rate of change includes a gyroscope, the spin axis of said gyroscope having a substantial component perpendicular to the longitudinal axis, a gimbal system for said gyroscope, the axis of said gimbal system being oriented perpendicular to said longitudinal axis and said spin axis, the torque of said gimbal system with respect to its axis providing said third correction input in response to angular rate of change of the geometrical vertical plane about said longitudinal axis.

20. The apparatus of claim 19 wherein the rotor of said gyroscope is contained within a member pivoted on a support axis, said support axis having a first component at right angles to said spin axis and said longitudinal axis, said first component serving as a gimbal axis to enable said pivoted member to serve as the gimbal system, said support axis having a second component parallel to said longitudinal axis, said second component serving as a pendulum axis so that the entire structure pivoted on said support axis serves as a compound pendulum, the torque produced about said pendulum axis providing the first and second correction inputs proportional to the linear and angular acceleration of the apparent vertical plane and the torque about said gimbal axis providing the third correction input proportional to the angular rate of change of the geometrical vertical plane.

21. The apparatus of claim 19 wherein said gyroscope gimbal system is supported in a support structure pivoted on an axis having a substantial component parallel with the longitudinal axis, said gyroscope with its associated gimbal system and pivoted support structure serving as a compound pendulum, said compound pendulum having a pendulous component about said longitudinal axis.

22. The apparatus of claim 21 wherein said pivoted support structure is linked to a flapper valve and said means to apply the control force to produce a roll-motion torque includes an hydraulic system comprising a supply source, a primary actuator for producing said roll-motion force, said flapper valve controlling the connection of said primary actuator to a pressure port of said source, and a second actuator connected to the same pressure port as the first actuator, the output of said second actuator being connected to said control valve in an orientation to reduce the opening of the control valve.

23. The apparatus of claim 8 wherein said vehicle is provided with wheels on both sides of said geometrical vertical plane, said wheels being adapted to run upon a roadway, said suspension system including means for adjusting the position of said wheels with respect to said vehicle, said adjusting means being operative to produce equal and opposite motions of the wheels on opposite sides of said geometrical vertical plane, said motions being in a plane parallel to said geometrical vertical plane, whereby the raising of the wheels on one side of said vehicle produces a corresponding lowering of the wheels on the other side of said vehicle with an accompanying change in the horizontal separation of said wheels, means to apply said control force to said adjusting means to produce the roll-motion torque, said force-applying means including an hydraulic piston to actuate said adjusting means to vary the elevation of said wheels with respect to said roadway, whereby the respective elevation of said wheels on each side of said geometrical vertical plane is changed in response to said control force, said piston being positioned within a cylinder in accordance with said control force, and additional means to permit the relatively free movement of said piston in response to roadway-produced changes in elevation of the wheels on one side of said geometrical vertical plane.

24. The apparatus of claim 23 wherein said means to permit the relatively free movement of said piston includes check valves, the check valves communicating with said cylinder, said check valves serving to relieve the pressure created within said cylinder by movement of said piston in response to locally produced changes in elevation of the wheels.

25. The apparatus of claim 8 wherein said vehicle is provided with an operator command system, said operator command system producing command control outputs, means utilizing said command control outputs to modify the control force and produce a modified control force, whereby the roll-motion torque produced by the control force is modified in response to command control outputs from said operator command system.

26. The apparatus of claim 8 wherein said means to apply said control force to produce a roll-motion force includes an hydraulic system comprising a supply source, a control valve and a primary actuator for producing said roll-motion force, said control valve controlling the connection of said primary actuator to a pressure port of said source, and a second actuator connected to the same pressure port as the first actuator, the output of said second actuator being connected to said control valve in an orientation to reduce the opening of the control valve.

27. The apparatus of claim 8 wherein said support system includes a first suspension system, said first suspension system serving to support the load of said vehicle, said first suspension system permitting substantially free motion in directions introducing deviations between the geometrical vertical plane and the apparent vertical plane, and the roll-motion torque produced by the erecting system controls the vehicle vertical stabilization independently of said first suspension system.

28. The apparatus of claim 8 wherein said vehicle includes an element to support an operator, said operator support element forming part of a compound pendulum, said compound pendulum being pivoted on an axis having a substantial component parallel with the longitudinal axis, the torque produced by said pendulum with respect to its axis providing a third correction input, and means to combine said first, second and third correction inputs to produce the control force.

29. A stabilized vehicle system comprising a vehicle having a geometrical vertical axis, a longitudinal axis and an apparent vertical axis, said geometrical vertical axis and said longitudinal axis defining a geometrical vertical plane, said apparent vertical axis and said longitudinal axis defining an apparent vertical plane, a first suspension system, said first suspension system serving to support the load of said vehicle, said first suspension system permitting substantially free motion in directions introducing deviations between said geometrical vertical plane and said apparent vertical plane, a second suspension system, said second suspension system being adapted to control motions introducing deviations between said geometrical vertical plane and said apparent vertical plane, force applying means for said second suspension system, means to sense the deviation between the geometrical vertical plane and the apparent vertical plane, and means responsive to said sensing means to energize said force applying means in proportion to said deviation between the geometrical vertical plane and the apparent vertical plane whereby said second suspension system controls the vehicle stabilization independently of said first suspension system and stabilizes the vehicle.

References Cited by the Examiner

UNITED STATES PATENTS

| | | | |
|---|---|---|---|
| 2,178,351 | 10/1939 | Tetens | 105—141 |
| 2,555,034 | 5/1951 | Hay | 280—6.1 X |
| 2,568,402 | 9/1951 | Lynn | 280—6.1 X |
| 2,579,570 | 12/1951 | Hauptman | 244—79 |
| 2,584,125 | 2/1952 | Haglund | 74—5.6 |
| 2,613,449 | 10/1952 | Eisler | 33—220 |
| 2,909,342 | 10/1959 | Maltby | 244—103 |
| 2,940,694 | 6/1960 | Barlow | 244—78 X |
| 2,967,062 | 1/1961 | D'Avigdor | 280—112 |
| 3,002,467 | 10/1961 | Bingham | 104—119 |
| 3,017,838 | 1/1962 | Bingham | 104—120 |
| 3,028,175 | 4/1962 | Eckman | 280—6.1 |
| 3,083,027 | 3/1963 | Lindblom | 280—6.1 |
| 3,119,349 | 1/1964 | Hampton et al | 104—243 |
| 3,174,440 | 3/1965 | Cockerell | 104—120 |

OTHER REFERENCES

Machover, C.: "Basics of Gyroscopes," volume 2, New York, Rider, 1960, pp. 2–1 and 2–2 only.

LEO FRIAGLIA, *Primary Examiner.*